(12) United States Patent
Czasny et al.

(10) Patent No.: US 12,350,882 B2
(45) Date of Patent: Jul. 8, 2025

(54) PRINT HEAD FOR THE ADDITIVE MANUFACTURING OF FIBRE REINFORCED MATERIALS

(71) Applicant: Technische Universität Berlin, Berlin (DE)

(72) Inventors: Mathias Czasny, Berlin (DE); Aleksander Gurlo, Berlin (DE); Oliver Görke, Berlin (DE); Franziska Schmidt, Berlin (DE)

(73) Assignee: TECHNISCHE UNIVERSITÄT BERLIN, Berlin (DE)

( * ) Notice: Subject to any disclaimer, the term of this patent is extended or adjusted under 35 U.S.C. 154(b) by 761 days.

(21) Appl. No.: 17/292,183

(22) PCT Filed: Nov. 8, 2019

(86) PCT No.: PCT/EP2019/080646
§ 371 (c)(1),
(2) Date: Oct. 15, 2021

(87) PCT Pub. No.: WO2020/094829
PCT Pub. Date: May 14, 2020

(65) Prior Publication Data
US 2022/0040919 A1 Feb. 10, 2022

(30) Foreign Application Priority Data

Nov. 8, 2018 (DE) .......................... 102018127934.5
Jun. 27, 2019 (DE) .......................... 102019117341.8

(51) Int. Cl.
*B29C 64/209* (2017.01)
*B29C 64/118* (2017.01)
(Continued)

(52) U.S. Cl.
CPC .......... *B29C 64/209* (2017.08); *B29C 64/118* (2017.08); *B29C 70/384* (2013.01);
(Continued)

(58) Field of Classification Search
CPC ................. B29C 64/209; B29C 64/118; B29C 70/384; B33Y 10/00; B33Y 30/00; B33Y 40/10
See application file for complete search history.

(56) References Cited

U.S. PATENT DOCUMENTS

2002/0079601 A1* 6/2002 Russell .................. B33Y 30/00
425/375
2010/0028593 A1* 2/2010 Taketa ...................... B32B 5/26
428/113
(Continued)

FOREIGN PATENT DOCUMENTS

| EP | 3141378 A2 | 3/2017 |
| WO | 2014153535 A2 | 9/2014 |
| WO | WO-2018189062 A1 * | 10/2018 ........... B29C 64/106 |

OTHER PUBLICATIONS

International Search Report of the ISA/EP in PCT/EP2019/080646, dated Feb. 10, 2020, 3pgs.

*Primary Examiner* — Jeffrey M Wollschlager
*Assistant Examiner* — Guy F Mongelli
(74) *Attorney, Agent, or Firm* — Haukaas Fortius PLLC; Michael Haukaas; Paul K. Judd

(57) ABSTRACT

In a first aspect, the invention refers to a printhead for the additive manufacturing of a fibre reinforced material, comprising a fibre reinforcement in a polymer matrix, comprising an infiltration unit for mixing and/or infiltrating a fibre roving with a molten polymer; at least one feeder for a polymer and/or a fibre roving to the infiltration unit; a heating element, at least for partially melting the polymer within the infiltration unit; at least one deflecting element within the infiltration unit and an outlet for the resulting fibre
(Continued)

reinforced material from the infiltration unit, wherein the molten polymer can be guided within the infiltration unit with a polymer flow direction, from the feeder to the outlet, along a channel between the feeder and the outlet, and the fibre roving can be guided within the channel, by means of deflection, around the deflecting element, area by area, transversely to the polymer flow direction, from the feeder to the outlet.

In another aspect, the invention refers to the use of a printhead for additive manufacturing, as well as to a process for additive manufacturing, and to a fibre reinforced material produced by the printhead.

35 Claims, 13 Drawing Sheets

(51) Int. Cl.
 *B29C 70/38* (2006.01)
 *B33Y 10/00* (2015.01)
 *B33Y 30/00* (2015.01)
 *B33Y 40/10* (2020.01)

(52) U.S. Cl.
 CPC ............... *B33Y 10/00* (2014.12); *B33Y 30/00* (2014.12); *B33Y 40/10* (2020.01)

(56) References Cited

U.S. PATENT DOCUMENTS

| | | | |
|---|---|---|---|
| 2010/0152880 A1* | 6/2010 | Boyden | A61K 38/38 700/283 |
| 2015/0108677 A1* | 4/2015 | Mark | B33Y 70/10 425/375 |
| 2016/0068678 A1* | 3/2016 | Luo | B29C 64/40 428/401 |
| 2017/0157851 A1* | 6/2017 | Nardiello | B29C 48/304 |
| 2019/0067147 A1* | 2/2019 | Tsutsumi | H01L 21/565 |

* cited by examiner

* $B_{total} = N \times W$

PRINT HEAD FOR THE ADDITIVE MANUFACTURING OF FIBRE REINFORCED MATERIALS

RELATED APPLICATIONS

This application is a National Stage filing under 35 U.S.C. § 371 of International Application No. PCT/EP2019/080646 filed Nov. 8, 2019, which claims priority under 35 U.S.C. § 119 (e) to German Patent Application Nos. 102019117341.8, filed Jun. 27, 2019 and 102018127934.5, filed Nov. 8, 2018, which applications are incorporated herein by reference.

DESCRIPTION

In a first aspect, the invention refers to a printhead for the additive manufacturing of a fibre reinforced material, comprising a fibre reinforcement in a polymer matrix, comprising an infiltration unit for mixing and/or infiltrating a fibre roving with a molten polymer; at least one feeder for a polymer and/or a fibre roving to the infiltration unit; a heating element for the partial melting of the polymer within the infiltration unit, at least; at least one deflection element within the infiltration unit and a discharge for the resulting fibre reinforced material from the infiltration unit, wherein the molten polymer can be guided within the infiltration unit with a polymer flow direction, from the feeder to the discharge, along a channel between the feeder and the discharge, and the fibre roving can be guided within the channel, by means of deflection around the deflection element, area by area, transversely to the polymer flow direction, from the feeder to the discharge.

In another aspect, the invention refers to the use of a printhead for additive manufacturing, as well as a process for the additive manufacturing and a fibre reinforced material produced by the printhead.

Context and State of the Art

The proposed invention belongs to the field of additive manufacturing processes and is specifically associated with the technique of material extrusion (Fused Deposition Modelling-FDM or Fused Filament Fabrication FFF). In this process, webs consisting of melted thermoplastics, ceramic materials or other materials are continuously deposited, by means of pushing the material through a nozzle. These webs are deposited layer by layer, depending on the given outer contour and inner structure, whereby the three-dimensional object is assembled.

Currently, various materials are commercially available as feedstock or raw materials, whereby the strength of thermoplastic polymers is very low. In order to achieve higher mechanical ... properties, comparable to those of metals, an endless or continuous fibre reinforcement can be incorporated, as an innovative solution. In this case, it is a composite material, made of reinforcing fibres, and a matrix material that can transfer the forces between the fibres. Endless or continuous means here that the fibres are not cut and, thus, at least a dimension of the component should be correspondingly long or should have a length of more than 10 mm as a local reinforcement. The production of a filament (feedstock/filament, which is pressed into the nozzle), with already incorporated endless fibres, is known to be used. This fibre-reinforced filament, as raw material, is then processed/printed in an actual printing process.

In the state of the art, the reinforced, infiltrated material is heated in the nozzle of the printer and discharged through a rounded nozzle. A major disadvantage of the process is that only materials with the specification of the used printer can be classified as raw material. Therefore, there is no flexibility in choice and combination of matrix and fibre reinforcement. Usually very small thread sizes of the fibres are used, which results in very high printing times for large objects. Other printheads are required for other thread sizes, whereby with thicker fibres, winding as filament is no longer possible for easy storage and/or feeding to the printer. The reason for this is the high bending stiffness, especially of the fibre in the matrix, which leads to large winding radii. In addition, it is only possible to use a thermoplastic as the matrix material, e.g. nylon for suppliers of the state of the art. However, this matrix material has disadvantages for many applications, such as strongly fluctuating mechanical properties, due to different moisture contents, for example. Also, the matrix content cannot be varied, as it has to be constantly adjusted during the production of the reinforced filaments.

It is also common in the prior art that the matrix material only wraps or coats the fibres and the fibre material does not penetrate into the fibre itself or between the fibres, when using a fibre bundle or roving. Therefore, forces cannot be transmitted between the fibres, or between the fibre and the matrix, to a desirable degree.

It would therefore be desirable to print or provide a fibre reinforced material that allows greater flexibility in choice and combination of fibre and matrix. In addition, a better bond between the fibres, or between the fibre (bundle) and matrix, would be desirable, in order to increase stability. Improved infiltration will also reduce the amount of pores in the composite and increase the mechanical strength of the composite.

Aim of the Invention

The aim of the invention is to provide a printhead, a fibre reinforced material and a process, without the disadvantages of the prior art. In particular, one aim of the invention was to provide a printhead, a fibre reinforced material and a process, in which a fibre reinforced material can easily be produced and flexibly adapted, whereby a higher stability of the material to be printed can be achieved, and a simple and cost-effective supply of the raw materials can be achieved.

SUMMARY OF THE INVENTION

The issue is solved by the features of the independent claims. Advantageous embodiments of the invention are described in the dependent claims.

In a first aspect, the invention refers to a printhead for additive manufacturing of a fibre reinforced material, comprising fibre reinforcement in a polymer matrix, comprising:
an infiltration unit for mixing and/or infiltrating a fibre roving with a molten polymer;
at least one feeder for a polymer and/or a fibre roving into the infiltration unit;
a heating element for at least partially melting the polymer within the infiltration unit;
at least one deflection element within the infiltration unit, and
a discharge of the infiltration unit for the resulting fibre reinforced material from the infiltration unit,
wherein the molten polymer can be guided within the infiltration unit with a polymer flow direction, from the feeder to the discharge, along a channel between the feeder and the discharge, and the fibre roving can be led within the channel by means of deflection around the deflection element, area by area, transversely to the polymer flow direction, from the feeder to the discharge.

In a second aspect, the invention refers to a printhead for additive manufacturing of a fibre reinforced material, comprising fibre reinforcement in a polymer matrix, comprising:

- an infiltration unit for mixing and/or infiltrating a fibre roving with a molten polymer;
- at least one feeder for a polymer and/or a fibre roving into the infiltration unit;
- a heating element for at least partially melting the polymer within the infiltration unit;
- at least one deflection element within the infiltration unit; and
- a discharge of the infiltration unit for the resulting fibre reinforced material from the infiltration unit, wherein the molten polymer and/or the fibre roving are guidable within the infiltration unit along a channel between the feeder and the discharge, and the fibre roving is deflectable within the channel by the deflection element, area by area, transversely and/or oblique to a rectilinear guide between the feeder and the discharge.

The following definitions, embodiments and advantages may refer to both the first aspect and the second aspect, in a manner obvious to an expert.

The production of the composite with a thermoplastic melt and "dry" fibres (fibres without matrix material, very flexible) can be carried out directly in the printhead, upstream of the nozzle, during a printing process. The polymer for the matrix for the embedding of the fibre and the fibre reinforcement are added individually to the printhead, and mixed there in the infiltration unit. In order to obtain a better bond between the fibre and the matrix, the fibre is preferably deflected several times within the unit or the mixing volume and, thus, also guided transversely to the flow direction of the polymer and/or to a straight line between the feeder of the fibres and the discharge of the resulting composite material, and a pressure field is built up by the deflection, perpendicular to the fibres, whereby the fibre is expanded. Thus, more polymer matrix can penetrate into the fibre or into the gaps between several fibres of a bundle in an improved manner, whereby the bond between fibre and matrix is significantly strengthened afterwards, during drying and/or cooling.

A printhead for additive manufacturing is, preferably, an essential component of a commonly so-called 3D printer. 3D printing is, preferably, also referred to as additive manufacturing. In this context, the so-called Fused Deposition Modelling (FDM) or Fused Filament Fabrication (FFF) is meant in particular. This refers primarily to a manufacturing process, in which a workpiece is produced layer by layer from a meltable plastic. This type of 3D printing can be used, in particular, for rapid prototyping. In particular, a fibre reinforced material comprising fibre reinforcement in a polymer matrix is to be printed. A polymer matrix is, preferably, also referred to as a plastic matrix.

A fibre reinforced material is known to the skilled person and, preferably, comprises reinforcing fibres made of fibres, e.g. carbon fibres, and a polymer or plastic matrix, which embeds the fibres. By plastic matrix and/or polymer matrix, one advantageously refers to a material, which comprises polymers, and in which the fibres are embedded. Since the fibres advantageously have a higher stiffness than the matrix, acting load or force is preferably guided along the fibres, which preferably increases the overall stability of the fibre reinforced material.

A fibre is, in particular, a linear, elongated fabric, consisting of a fibrous material and having a fibre shape, the longitudinal shape being, for example, smooth or curly, and the cross-sectional shape being, for example, round or angular. Fibres are primarily thin threads, preferably a few micrometres in diameter. However, thicker and/or thinner fibres are also known and can be used. A fibre roving or only roving, preferably, consists of several fibres and, therefore, forms a fibre bundle. In technical applications, only fibre roving is often used, in order to increase manageability. Furthermore, fibres can also, preferably, be in the form of yarn, in which case fibres of different lengths are in particular twisted or interwoven with each other.

The plastic may preferably comprise a thermoplastic, thermosetting and/or elastomeric material. Thermoplastics are easy to process. Thermosets are preferably particularly stable even under high temperatures and cannot be deformed, especially under the influence of heat. Elastomers in particular have a high conversion capacity and possess a higher energy adsorption.

The plastic or the polymer can, for example, consist of resin and/or hardener. Condensation resins, as well as reactive resins, can be used, which, in contrast to the former, harden mainly without splitting off volatile components, solely by polymerisation or polyaddition. Thus, it is advantageous, in order to avoid damage to the health of persons involved in the production.

Hardeners are preferably materials which, in particular together with the used resin, lead to a hardening into a solid substance, primarily a solid plastic. Hardeners are preferably selected from the group comprising polyamines, amine adducts, poly-aminoamides, ketimines, poly-isocyanates, blocked isocyanates, cyanoguanidine, amidines, anhydrides of dicarboxylic acids, polyester resins containing carboxy groups, dicarboxylic acids, aldehydes, ketones and/or divinylbenzenes, diallyl phthalate and/or triglycidyl isocyanurate.

The printhead is, preferably, an essential part of the printer. Preferably, a relative movement takes place between the printhead and the printing surface, on which the material is to be printed, through whose horizontal (or parallel to the printing surface) movement components, a deposition of the material to be printed takes place in the horizontal plane of the printing surface. Vertical movement components (or vertical to the printing surface) control the deposition in height (vertical to the printing surface). Preferably, the printhead comprises, in particular, an output area where the material to be printed is deposited on the printing surface, according to the workpiece to be printed. This can be a nozzle, in particular. In addition to this element, the printhead can comprise further elements that must necessarily be placed upstream of the output area, for a functioning printing.

In particular, the printhead comprises an infiltration unit for mixing and/or infiltrating a fibre roving with a molten polymer. A fibre roving preferably denotes a bundle of fibres. Preferably, the individual, finest fibres can be combined in the fibre reinforcements, in order to form a so-called roving. A fibre roving is preferably a bundle, strand and/or yarn of fibres disposed in parallel. The number of combined fibres is indicated, in particular, by the number of filaments, which preferably directly corresponds to this number. Units of a thousand fibres are preferably abbreviated with k, 50,000 fibres in a roving thusly correspond, in particular, to 50 k. For example, the fibre roving may have a number of filaments between 1,000 and 50,000 and/or a fineness between 30 and 3,500 tex or between 40 and 400 tex. The fineness is preferably . . . expressed in tex. tex corresponds, in particular, to the material in grams per thousand metres of length of a fibre or roving.

The infiltration unit is preferably also called the mixing volume. In the infiltration unit, in particular, fibre roving and polymer are brought together in such a manner that a fibre reinforced material comprising fibre reinforcement is formed in a polymer matrix for the preferred subsequent 3D printing. For this purpose, fibre roving and polymer should preferably be present simultaneously in the infiltration unit, with the polymer preferably substantially or partially molten. Melting means, in particular, a phase transition of the solid polymer into the liquid aggregate state, preferably due to heat supply and/or pressure reduction. The molten polymer can preferably be more or less viscous or semifluid.

Terms such as substantially, approximately, about, etc. preferably describe a tolerance range of less than ±40%, preferably less than ±20%, more preferably less than ±10%, even more preferably less than ±5% and especially less than ±1%. "Similar" preferably describes sizes that are approximately the same. "Partially" preferably describes values of at least 5%, more preferably at least 10%, and more preferably at least 20%, in some cases at least 40%.

In particular, a heating element in the infiltration unit is used for this purpose. For example, a heating element may comprise at least one electric heating wire. The heating element may preferably be connected to a control device (e.g. control unit, in the form of an integrated circuit), which controls the temperature of the heating element and, thus, ensures the desired molten state of the polymer. A temperature sensor is preferably used to read the actual temperature, which controls the heating element, in particular with the help of the electronics (e.g. control device).

The printhead comprises at least one feeder for a polymer and/or a fibre roving to the infiltration unit, which are present there together. The feeder may, in the simplest case, comprise an inlet to allow access for the relevant material from an outer part of the printhead to the mixing volume. Preferably, media are included for a controlled feeder, so that fibre roving and/or polymer are always present in the desired quantity. This can be controlled e.g. motor driven, where the feeder, e.g. the motor, is controlled by an electronic control, in particular an integrated circuit. However, simpler mechanisms are also preferably included. Here, both fibre roving and polymer can be fed via the same feeder. Preferably, at least one feeder is included both for polymer and fibre roving.

The printhead further preferably comprises an outlet of the infiltration unit for the resulting fibre reinforced material. The outlet preferably comprises at least one opening of the infiltration unit, from which the resulting material can exit the infiltration unit. The outlet can flow directly into an output area of the printhead, e.g. a nozzle. However, the discharge can also be followed by further processing and/or transport of the resulting material, before it reaches an output area.

Preferably, the infiltration unit comprises a channel between the feeder and outlet. When operating the printhead, in particular the infiltration unit, the raw materials to be mixed, polymer and/or fibre roving, are preferably transported within this channel, from the feeder to the outlet. In a simple case, the channel can be a tubular recess (volume) within the infiltration unit, which runs essentially straight from the feeder to the outlet. Polymer and/or fibre roving preferably move along the channel towards the outlet. The movement can be produced, for example, by a drive mechanism on the feeder, which exerts a force on these materials that is responsible for movement in this direction. The fibre roving may preferably be a motor-driven roller. The polymer can also be supplied to the feeder, e.g. in one piece (e.g. filament), in the form of a melt and/or as granulate, whereby the polymer is also supplied in one piece, e.g. in the form of at least one motor-driven roller or as granulate by a motor-driven spiral. The force thusly exerted on the relevant material preferably also causes a movement within the channel, by means of transferring force. Preferably, in order to support the movement at the outlet, in particular behind the outlet outside the infiltration unit, a further drive mechanism can be present, to additionally pull the resulting fibre reinforced material out of the infiltration unit, by exerting a tensile force. This can preferably be realised by a haul-off unit.

While inside the channel, the fibre roving is unchanged in its textile-like structure and moves accordingly, in essence, as a unit, and the polymer is preferably melted (at least partially) by the heating element, so that it is now preferably moved (at least partially) in liquid form along the channel. This preferably results in different movement modes of these two materials. While, for example, the fibre roving can be guided in particular, in essence, localised within the channel, the molten polymer fills the entire volume formed by the channel along the path from the feeder to the outlet. The flow direction of the polymer is preferably determined by the form of the channel and the forces (tensile and/or compressive) from the feeder to the outlet. It may also be preferred that the polymer is present in the infiltration unit, without having a significant flow velocity in one direction. The fibre roving, in turn, can preferably be controlled in its movement within the channel by means of guiding and/or deflecting. For this purpose, at least: one deflecting element of the infiltration unit is preferably included. In particular, this is at least partially present within the channel. The deflecting element may be in the form of at least one roller and/or a cylindrical element, such that the fibre roving is guided and/or moved within the channel, at least area by area, transversely to the flow direction of the polymer. To substantiate the meaning of the word "transverse" in this context, it is preferred that the movement of the polymer and/or the fibre roving from the feeder to the outlet is assessed based on a three-dimensional velocity vector, which can preferably be described by three mutually orthogonal vector components in three spatial directions. The direction of the components can preferably be chosen arbitrarily. Transverse now preferably means that the movement/velocity of the fibre roving can be described by at least one vector component, perpendicular to the velocity vector of the preferably flowing polymer, which is preferably clearly different from a velocity '0'. The velocity can be described, for example, by the unit metres per second (m/s). The velocity vector of the polymer can be described, for example, by an average value. This velocity vector is preferably called flow direction of the polymer. Even if individual molecules or areas of the molten polymer can be described in their movement by velocity vectors that differ from one another, the different vectors can preferably be averaged, whereby the flow direction of the polymer is preferably determined by this average value. This flow direction of the polymer is preferably essentially, or at least partially, parallel and/or identical to a straight connection from the feeder to the outlet. The fact that the fibre roving can be guided within the channel by means of deflection around the deflecting element, area by area, transversely to the flow direction of the polymer, from the feeder to the outlet, means, in particular, that the molten polymer passes the polymer at least area by area within the channel. In its movement, the fibre roving has at least one vector component, perpendicular to the flow of the polymer, so that the flow of the polymer reaches one transverse side of the roving and flows through the spaces formed by the roving and leaves it again on the other transverse side of the roving. Advantageously, the roving is thereby extensively wetted or infiltrated by the molten polymer and can thereby form an improved fibre reinforced material. At least one deflecting element is preferably configured and/or disposed in such a manner that the fibre roving cannot be moved from the feeder to the outlet in a straight line, but receives a deflection transversely to such a connection. The molten polymer can also be influenced in some areas by the deflecting element, in its preferably straight-line movement between the feeder and the outlet, but due to the preferably liquid character, such a possible influence is less noticeable, as such, the result continues to be an average movement, to which the movement of the fibre roving is transverse, at least in some areas.

The fact that the polymer and/or fibre roving can be guided within the infiltration unit, along a channel between the feeder and the outlet, means, in particular, that the infiltration unit is designed for the polymer and/or fibre roving to be present there and to infiltrate each other, so that a corresponding composite material can leave the outlet. Conductible preferably means that the fibre roving can be moved along the channel (around the deflecting elements), from the feeder to the outlet. The polymer can, but does not have to flow, it can also preferably only be present in the infiltration unit in a substantially homogeneous state and preferably without air bubbles.

It may also be preferred that the polymer does not flow and/or flow substantially or that it only slightly flows. It may even have a velocity component that points away from the outlet, e.g. in the direction of an overflow. In particular, it is essential that the fibre roving through at least one deflecting element has a velocity component (preferably in relation to the polymer), which runs transversely and/or obliquely to a straight line between the feeder and the outlet. However, preferably always a small portion of the polymer is moved through the fibre roving to the outlet to form the fibre reinforced material.

Not only can the contact between the polymer and the fibre roving be increased, but a pressure field can also be applied by the polymer and/or the deflecting element to the fibre roving, preferably with simultaneous expansion of the fibre roving, thus improving the infiltration of the polymer into the fibre roving.

Preferably, the speed of the fibre roving is about the same as the movement speed of the printhead, as the fibres are preferably not flexible. For example, it is possible to work at a speed of about 5 mm/s, corresponding to 300 mm/min. Typically, in 3D printing, speeds in a range of about 30-60 mm/s are preferred, but 60-120 mm/s is also preferably possible. However, there is preferably a trade-off between speed and the quality of the printed component, which, in particular, also depends on the quality of the printer. The speed of the flow of the polymer is preferably comparatively low and above all dependent on the cross-section of the chamber. With a decreasing cross-section, the speed preferably increases, whereby the viscosity also preferably changes, due to a higher shear rate. Since the polymer is preferably extracted by means of infiltrating the roving, the flow velocity near the inlet is preferably higher than, for example, at the outlet. At the outlet, a flow velocity as low as possible is preferred, so that not too much polymer is ejected. The flow velocity, multiplied by the cross-section, preferably describes the volume flow. However, it is advantageous that the polymer flows, as this particularly means that the chamber is always completely filled. Thus, for example, air bubbles can be avoided and not be incorporated in the roving (missing matrix=poorer mechanical properties). Likewise, a polymer that is not completely fresh is preferably ejected from the printhead piece by piece. This is preferable due to the fact that high temperatures, for example, can lead to the destruction of the polymer (depending on the used polymer and the printing temperature).

By means of this technique, thicker fibre bundles, different matrix materials and different matrix parts can be used or produced with a printhead. The fibres or the fibre roving is not only coated, but the matrix material penetrates into the fibre/roving (especially into the spaces between). This is essential, in order to be able to transfer forces between the fibres and thusly enable greatly improved mechanical properties, advantageously similar to those of a metal.

The infiltration is favoured mainly by the expansion of the fibre strand and/or the pressing of the polymer through a pressure field. The flow in the channel is important for the preparation of the matrix, but, in particular, the flow has an influence on the infiltration.

Table 1 summarises some advantages of the printhead, as compared to the prior art.

TABLE 1

Comparison of prior art printing technologies with the innovative approach described herein

| Process: | Printhead for pre-produced continuous filaments | Innovative printhead: mixing thermoplastic and fibre bundles in the infiltration chamber |
|---|---|---|
| Possibility to infiltrate in the printhead | No | Yes |
| Are different thread sizes possible? | Only one size per printhead possible | Different thread sizes are possible with the same printhead |
| Large thread sizes? | No, only small thread sizes can be rolled up as filament. | Yes, large thread sizes are possible, as "dry" fibres are easy to roll up. |
| Number of matrix materials? | Only one matrix material per manufactured filament | Multiple matrix materials can be fed into the printhead, local different moulds possible |
| Gradation? | No, not possible | Yes, possible |
| Matrix of raw materials | Default in filament production | Use of filaments, granulates or directly from a polymer melt produced in a different way |
| Matrix percentage in the component? | Constant | Modifiable |
| Printing time for large components: | Long printing time, due to small thread size and prescribed matrix percentage | Adjustable printing time, larger thread sizes possible and matrix percentage modifiable. |
| Mechanical properties? | Rather poor to average, due to an imperfect bond between matrix and fibre | Very good mechanical properties, thanks to the improved bonding of the fibres to the matrix material. |

The developed idea offers applications in all areas, such as aerospace, automotive, medical technology, general and special machine construction. Whenever it comes to low quantities (<10-100) and in best case quantity 1, additive manufacturing can provide a cost advantage, when compared to other technologies. The use of continuous carbon fibre reinforcement allows new design possibilities in the field of lightweight construction. Due to the preferred digital manufacturing and automation, the use of the specially researched printhead provides great advantages, as compared to technologies with high human resource allocation (handicraft) or data processing (Industry 4.0, BigData).

The best use is preferably in the field of medical technology, in the production of prosthetic shafts and orthotic components. In the case of prostheses (body part must preferably be replaced), for example, the blunt form can be taken by means of a scan and the component can be modelled on the computer. A subsequent printout or reinforcement with the continuous fibre composite allows a digital production, which is not yet operational in this manner. The same applies to orthoses, where one part of the body needs to be preferably supported. Due to patient-specific individualisation, the components must always be produced in an individual quantity (1), as the patient also changes within periods of 1-3 years. On the other hand, production lines that are optimised for a specific type of prosthetic shaft, e.g. for the thigh, can . . . be set up and several thousand shafts, with slightly different geometries, can be produced. This would make economical, automated production of components in quantities of 1 possible. This is not currently possible with any other process.

The presented invention advantageously allows the infiltration of the carbon fibre roving. For this purpose, the fibre bundle is preferably guided over pins or rounded corners and, thus, in particular, the polymer melt is pressed into the fibre strand by a pressure field. Advantageously, this is further facilitated by the expansion of the strand. In comparison to the existing technology of pre-infiltrated continuous fibre-reinforced filaments, thicker fibre rovings can advantageously be used with the presented printhead technology, since the minimum bending radii are smaller than in the composite. Furthermore, the fibre volume content can locally vary or different matrix materials can simply be used.

Possible applications exist, in particular, in the aerospace industry, automotive industry, medical technology (prosthesis and orthosis production), and mechanical engineering.

In a preferred embodiment of the invention, the molten polymer can be guided within the infiltration unit with a polymer flow direction, from the feeder to the outlet, along a channel between the feeder and the outlet, and the fibre roving can be led within the channel by means of deflection around the deflecting element, area by area, transversely to the polymer flow direction, from the feeder to the outlet. Thus, an infiltration can be designed in a particularly efficient manner.

In a preferred embodiment of the invention, a nozzle is included for the controlled placement of the fibre reinforced material on a printing surface, the nozzle being located at the outlet. A nozzle preferably comprises a cross-section of an opening for the material to be printed, which cross-sectionally narrows towards the printing surface. In particular, a nozzle comprises a narrowing outlet cross-section for the fibre reinforced material to be printed. Thus, a particularly compact printhead can be provided. A nozzle as a discharge area, which is drawn close to or is located on a printing surface for printing, has proven to be particularly suitable for FMD/FFF printing.

In a further preferred embodiment of the invention, a nozzle for the controlled placement of the fibre reinforced material on a pressure surface is comprised, wherein the nozzle is located at the outlet and wherein nozzle and pressure surface are preferably configured for a relative movement between nozzle and pressure surface, in particular in all spatial directions and/or with all possible degrees of freedom. A relative movement can thereby preferably be achieved, both by moving the nozzle and by moving the pressure surface, and, in particular, by moving both elements relative to one another. The possible degrees of freedom preferably include, in addition to translatory degrees of freedom, rotatory or rotational degrees of freedom. This allows the printing of complex, three-dimensional components.

In a further preferred embodiment of the invention, the printhead comprises at least two, preferably at least three, more preferably at least four, and, in particular, at least five deflecting elements. This allows the fibre roving to be deflected/diverted several times and/or in different directions, and a cross-linking with the polymer can be improved. In the case of several deflecting elements, it is particularly preferred that the deflecting elements are disposed on opposite sides, along the channel. Thus, a particularly efficient deflection can be carried out in alternating directions.

In a further preferred embodiment of the invention, 2-8 deflecting elements, in particular 5 deflecting elements, are included. This number of deflecting elements has proven to be particularly efficient, and, at the same time, the construction of the printhead can be kept simple. In particular, 5 deflecting elements ensure excellent infiltration and, at the same time, an infiltration chamber that is kept compact.

In a further preferred embodiment of the invention, at least one feeder is included for the polymer and at least one feeder is included for the fibre roving. By having a single feeder for: each raw material, the feeder can be particularly well adapted to the relevant material and, thus, improved.

In another preferred embodiment of the invention, the layout and/or a radial extension of the deflecting element is configured for deflecting the fibre roving around the deflecting element, changing the speed of the fibre roving, widening the fibre roving and/or guiding the fibre roving transversely and/or diagonally to the polymer flow direction and/or guiding it in a straight line between the feeder and the outlet. In particular, the deflecting element deflects the fibre roving from a direct path between feeder and outlet, which would result, if the deflecting element were not included. For the deflection, a force on the fibre roving perpendicular to the longitudinal axis of the roving and/or perpendicular to a direct path between the feeder and outlet is preferably achieved. This not only achieves a deflection of the fibre bundle, but also an additional widening of the fibre roving, so that spaces between the individual fibres of the bundle are created or enlarged, and can be better reached by the polymer. Due to the deflection and the forces acting laterally on the roving, the essentially round cross-section of the bundle is preferably changed to an elliptical cross-section and a widening of the bundle is achieved. A change in speed is preferably achieved by means of the deflection. This is preferably achieved, on one hand, by changing the direction of the movement, which preferably already includes a change in the speed of the fibre roving. Furthermore, the deflection/guidance carried out by the deflecting elements also results in a slowing down of the fibre bundle, preferably due to frictional forces between the deflecting element and the fibre bundle. These frictional forces preferably also cause the fibre roving to widen, because these forces act against the bundled layout of the roving, without spaces in between. Preferably, the deflecting element acts like a guiding element for the fibre roving, so that the roving is preferably guided. Guiding preferably means that the speed and/or movement direction of the roving can be controlled. Such deflecting elements can improve infiltration and bonding between the polymer matrix and the fibre bundle.

Preferably, the infiltration is the first step before the bonding, to allow the polymer to adhere to the fibre in the first place. This is preferably essential for the basic definition of a bond, as it allows the fibres to be fully embedded in the matrix. The bonding is preferably referred to as physical and/or chemical bonding. If fibre and matrix are "repellent" (preferably non-polar and polar surface tensions), then, despite an infiltration, preferably no or only low forces could be transmitted, and the bonding is preferably poor.

The deflection of the pin primarily supports the infiltration and preferably does not support physical and/or chemical bonding, but preferably allows this to take place in the first place, in light of the fact that, without a matrix between the fibres, no bonding can take place either.

Cross-linking between polymers can preferably only take place, if active groups are present, such as is the case with thermosets (epoxy resin, polyester resin) or with certain additives. The deflection with the pins mainly ensures that the polymer can be incorporated into the matrix to begin with.

In a further preferred embodiment of the invention, the deflecting element is cylindrical, at least in some areas, and has an axial configuration perpendicular to the polymer flow direction and/or to the straight-line movement between the feeder and outlet within the channel. Cylindrical elements have proven to be particularly suitable deflecting elements, due to the fact that they exert a particularly "gentle" deflecting force, which does not impair the integrity of the fibre bundle, due to the round lateral surface, which causes the deflection to be at least area by area. If angular and/or pointed areas were provided for the deflection, these could easily cause the fibre bundle to break or become cut. The cylindrical deflecting element is preferably disposed in such a manner that the fibre bundle is deflected on its way from the feeder (of the fibre bundle) to the outlet by the cylinder's lateral surface, projecting into the path at least area by area, and the fibre bundle coming into contact with this lateral surface area by area. Thereby, the roving preferably moves in longitudinal direction over a part of the cylinder circumference and follows this part of the circumference during its movement. The deflecting element preferably does not have to have a complete cylinder shape, but can represent a segment of a cylinder, which would occur, for example, if a cylinder were cut along its longitudinal direction. Preferably, one-eighth, one-fourth, three-eighths, one-half, five-eighths, three-fourths and/or seven-eighths of a complete cylinder may be comprised by the segment. This segment preferably essentially forms the deflecting element and is present, in particular, within the channel. The segment can, in particular, be in the form of a cylinder segment-like convexity within a side wall of the channel. The axial layout of the sectionally cylindrical deflecting element perpendicular to the polymer flow direction refers, in particular, to an axial layout, perpendicular to the averaged polymer flow direction. The orientation can preferably also be defined as perpendicular to the straight-line movement between the feeder and outlet. Such a definition is particularly useful, if the polymer does not essentially flow from the feeder to the outlet. In particular, the deflecting element is in the form of a cylinder segment, projecting into the channel. It may also be preferred that the axial layout is perpendicular (or substantially perpendicular) to a straight connection between the feeder of the polymer and/or the fibre roving and the outlet and/or perpendicular (or substantially perpendicular) to a longitudinal axis of the channel. Preferably, at least two of these definitions of perpendicular layout match. Such a deflecting element is particularly efficient, robust and easy to manufacture.

The deflecting element is preferably, at least in some areas, cylindrical or round, and has an axial layout in the infiltration channel, whereby the layout allows the fibre to be deflected from a linear path between the inlet and outlet.

In another preferred embodiment of the invention, the deflecting element comprises at least one rounded edge and/or pin within the channel. This embodiment may be a preferred embodiment of the aforementioned deflecting element, which is area by area cylindrical. A rounded edge may preferably protrude into the channel and, thus, provide a deflecting element for the fibre roving on its "direct" path between feeder and outlet. A rounded edge can preferably be directly integrated into a side wall of the channel and/or be a component of a side wall of the channel. A rounded edge may preferably be designed as a segment of a cylinder, as described above. A pin may be a particular embodiment of an at least area-wise cylindrical element, and preferably represents a complete cylinder. Such a pin may protrude, at least area by area, into the channel, in the form described. In particular, it is preferred that such a pin represents a separate element, which can be fixed in the side wall of the channel by means of a locking device. In particular, such a pin can be dismantled, which is especially advantageous for maintenance and/or cleaning.

In a further preferred embodiment of the invention, the deflecting element has a bend found transversely to the polymer flow direction, which can be described, at least in some areas, by a radius, the radius preferably being between 1-20 mm, more preferably between 2-5 mm and in particular 4 mm. This radius would, for example, preferably comprise the radius of the (segmented/area-wise) cylinder in the case of a pin, a rounded edge and/or an area-wise cylindrical deflecting element. The described radii have proven to be surprisingly suitable, in particular for widening and changing speed.

In another preferred embodiment of the invention, the deflecting element, in particular the rounded edge and/or the rounded pin, is positioned to cross the centre of the channel. The centre of the channel is preferably described by an axis of symmetry in the longitudinal direction and/or by an area within the channel in the longitudinal direction, which is approximately equidistant from the surrounding nearest points of side walls. Due to such a positioning, a deflection is particularly strong, the fibre roving cannot be guided along a centrally disposed longitudinal axis along this from the feeder to the outlet, but is deflected on its way by at least one deflecting element, so that a widening and/or an area-wise guidance/deflection, transverse to the polymer flow direction, is achieved. Thus, the infiltration and binding of the polymer matrix in the fibre roving is surprisingly improved.

Now follows an exemplary illustration of the preferred embodiment. The core of the printhead is preferably the infiltration unit, in which the fibres are infiltrated with the polymer melt (matrix material). The infiltration is preferably allowed by running the fibres around rounded edges or pins. The number of rounded edges/pins is preferably at least 1, very preferably 2-8, in particular 5. The radius of the pins/edges is preferably between 1-20 mm or larger, particularly preferably between 2-5, in particular 4 mm. The rounded edges/pins are preferably positioned to cross the centre of the channel, so that the fibres are deflected. In particular, they are positioned in such a manner that a centre angle of less than 180° results. Preferably, the centre angle is about 32.5°, which corresponds to an arc length of 2.26 mm for a preferred pin radius of 4 mm. The arc length is, in particular, the contact length between fibre and pin. The central angle preferably describes the angle formed by different end points of an arc, with its centre point M. The central angle is preferably determined by means of observing a cross-section of the infiltration channel and/or the deflecting elements. In particular, the considered end points are the two end points of a contact area of the fibre with the deflecting element and the centre point preferably lies on the axis of the deflecting element, which is cylindrical, at least in some areas.

This layout widens the fibre strand in particular and, thus, makes it easier to penetrate/infiltrate the roving/fibre bundle with the molten matrix, as the strand with a round cross-section preferably becomes a strip with a significantly smaller thickness for infiltration. In addition, a pressure field is built up at the rounded edges/pins, with which the matrix polymer can be pressed/integrated into the fibres. The feeder of the melt can be in the form of a filament, granulate or other type. The melting of the material can preferably take place in the mould itself or in the process before feeding into the mould. The mould temperature should advantageously be higher than the melting temperature of the matrix polymer. It is preferred to use filaments, which are fed into the mould by means of a Bowden extruder. The advantage here is that the moving printhead does not have to bear the weight of the extruder motor and, thus, the moving material can be reduced. For special polymers with a tendency for strong chain degradation, it would also be possible to use granulates directly, which produce a melt with a screw extruder.

In a further preferred embodiment of the invention, melting of the polymer is carried out before the feeding. The polymer can be fed into the infiltration unit, already in liquid form. Thus, the infiltration unit requires less energy to generate the heat needed for a phase transition of the polymer to a liquid state. This way, the infiltration unit can be kept particularly simple, compact and light.

In a further preferred embodiment of the invention, the heating element is configured for heating the polymer and/or the fibre roving, at least area by area, to a temperature above the melting temperature of the polymer. Thus, the polymer can be kept in a liquid state, in a particularly efficient manner. It may be particularly preferred that a temperature significantly above the melting point produces a particularly liquid polymer, which wets the fibres of the bundle particularly well. It may also be preferred that the temperature is chosen, so that the polymer is rather semi-fluid (e.g. only slightly elevated above the melting temperature). For some materials, this can increase the friction between the fibre bundle and the polymer, which can lead to a better cross-linking.

In another preferred embodiment of the invention, the infiltration unit comprises at least one material overflow for the polymer. This allows excess matrix polymer to be discharged. With the overflow, it is possible for a low pressure to prevail in the mould. If there is a high pressure present, the pores in the matrix material can be under pressure and then expand during further melting, and significantly deteriorate the quality of the composite. This is avoided or reduced by means of using lower pressure. The overflow can be dimensioned in such a manner that, in conjunction with the feeder, a preferred pressure range can be set within the infiltration unit.

In another preferred embodiment of the invention, the material overflow is configured to discharge the polymer in the polymer flow direction and/or in and/or opposite to the direction of fibre movement. The location of the overflow can preferably be in the direction of fibre movement—and/or polymer transport, or in the direction opposite to the direction of fibre movement. Thus, depending on the design of the printhead or the complete printer, a suitable design can be found. Preferably, several feeders can also be included (see below), in which case the size and/or number of at least one overflow will preferably be adapted.

In another preferred embodiment of the invention, the polymer is fed in the form of granulate and/or filament. A filament is preferably a plastic that is present in an elongated form, e.g. in the form of a wire and/or made up on rolls, and is frequently used in the FDM/FFF process. A granulate is preferably a polymer, which is in the form of coarse grains or particles. Polymers in this form are particularly easy to feed using standard processes. Since polymers can often be obtained in this manner by default, they can be procured cheaply and in a resource-saving manner.

In another preferred embodiment of the invention, the filament is fed directly and/or through a Bowden extruder. In particular, a Bowden extruder is a tubular sheath, in which the filament can be guided, preferably a Bowden cable. Preferably, the Bowden extruder is fixed to the feeder. Preferably, the filament is moved and/or fed by a drive mechanism, e.g. a stepper motor. The Bowden extruder is preferably flexible and the drive mechanism is, in particular, not directly fixed to the printhead, but e.g. to a housing or chassis. A particular advantage here is that the moving printhead does not have to carry the weight of the drive mechanism (preferably also called extruder motor) and, thus, the moving material can be reduced.

In a further preferred embodiment of the invention, granulate is fed by a screw extruder. In addition to conveying the filament, it is preferably also possible to produce the polymer melt by means of a screw extruder or a similar device and to feed it directly into the printhead. A screw extruder is preferably used to move forward and feed granulate by means of a rotatably driven screw. Thereby, granulate can already be heated and/or melted in the screw, before it is fed. Thus, a feeding and/or melting can be carried out particularly efficiently. Especially for special . . . polymers, which tend to present strong chain degradation, it would be good to use granulates, which are melted with a screw extruder, to produce a melt.

In another preferred embodiment of the invention, a material conveying unit is comprised behind the infiltration unit, which is configured for transporting the fibre reinforced material towards the nozzle. Preferably, this may also be referred to as a haul-off unit. In particular, it is preferred that the material passing through the outlet from the infiltration unit cools down and solidifies, at least partially, so that good handling and/or conveying can be achieved. Therefore, this embodiment is particularly suitable in combination with a subsequent hotend (see below). The material conveying unit can comprise, for example, two counter-rotating rollers or wheels, whose movement can convey a fibre reinforced material, present between these rollers or wheels.

In another preferred embodiment of the invention, a cutting tool is included for the purpose of cutting and/or dividing by means of cutting the fibre reinforced material. A cutting tool, also referred to as a cutting unit, can be achieved, for example, by means of a knife and/or a clamp-forceps-like element, which, if required, is moved in the direction of a fibre reinforced material, a fibre roving and/or a filament, in such a manner that the latter is cut through at a desired point/area, preferably in the transverse direction. The cutting tool can be disposed, for example, at the outlet of the infiltration unit, outside the latter. Advantageously, the cutting unit makes it possible, for example, to insert several reinforced areas in one layer, to print two components without direct connection or to insert predetermined breaking points. Preferably, during printing, it can be removed and reapplied with a new fibre reinforced material. Advantageously, a production of complex components, e.g. with local reinforcements, is possible only with the cutting unit. The infiltration chamber for the production of a pore-free composite material, consisting preferably of fibre and matrix, can be extended with a cutting unit. This is located, for example, between the heated infiltration chamber and the heated nozzle, or after the nozzle. The nozzle is preferably used here to describe the lowest mould opening, which lays the composite material on the component platform/pressure surface. Therefore, there is preferably only one exit for the fibre reinforced material at the mould in this set-up. To convey the composite material, a conveying unit is used between the cutting unit and the infiltration tool with cooling in front of it. To convey the material, it is preferred to cool it to temperatures below the melting point, usually also below the glass transition temperature of the matrix material, in order to avoid deformation of the strand. When arranging the cutting unit between the nozzle and the infiltration chamber, it is preferably considered that the material must still be placed after the cutting. In the machine code, the correct control of the cutting unit is preferably configured accordingly. Thus, the cutting is carried out, in particular, before the completion of the applied web, depending on the distance between the cutting unit and the nozzle. When the composite is reapplied, the material should preferably also be conveyed to the nozzle again. The cutting unit makes it possible to insert several reinforced areas in one layer, to print two components without direct connection or to insert predetermined breaking points. The cutting unit is an advantageous element in the printhead, which allows the production of complex components with local reinforcements.

In another preferred embodiment of the invention, the cutting tool is present before the nozzle, disposed between the nozzle and the infiltration unit. This allows the fibre reinforced material to be cut, before it exits the nozzle and is printed. A cutting unit thusly realised is particularly easy to implement, as the nozzle can remain directly on the printing surface in a printing area during cutting. When arranging the cutting unit between the nozzle and the infiltration chamber, it can preferably be considered that the material still has to be placed after cutting. In the machine code of a control device that regulates the aforementioned processes (e.g. integrated circuit), the correct control of the cutting unit is preferably configured accordingly. The cutting is preferably carried out before the end of the deposited web, depending on the distance between the cutting unit and the nozzle, as the remaining material, in particular, has to be pulled out of the nozzle after cutting. With a new start-up, the material must preferably also be conveyed to the nozzle again, before a new printing can be carried out. Preferably, in this embodiment, the fibre reinforced material is cooled at least sufficiently, before cutting, to allow a precise cutting. Therefore, the combination with a subsequent hotend is particularly preferred in this embodiment.

In another preferred embodiment of the invention, a hotend comprising a nozzle and a heating element, in order to heat the nozzle, is included. The heating element is preferably integrated in the nozzle. This ensures that the fibre reinforced material is sufficiently fluid during printing, in order to form a bond with the already printed material and/or the printing surface, or the fibre reinforced material has a desired consistency for printing. In particular, if at least partial cooling of the fibre reinforced material below the melting temperature of the polymer occurs between the infiltration unit and the hotend, a hotend is preferred.

In another preferred embodiment of the invention, a cooling element is included between the infiltration unit and the cutting tool and/or hotend. A cooling of the fibre reinforced material can be actively promoted by the cooling element, e.g. in order to achieve a better cutting and/or a transport through a haul-off unit. Thereafter, for the aforementioned reasons, a nozzle in the form of a hotend is particularly advantageous. A cooling element can be, for example, a passive cooling element, which is essentially formed by a heat sink, comprising ridges for cooling. In this case, the fibre reinforced material is guided inside the heat sink and, thereby, preferably cooled. It can also be preferred that the heat sink enables an active cooling, e.g. by means of a cooling Peltier element.

In a further preferred embodiment of the invention, the cutting tool is disposed behind the nozzle and the printhead is preferably configured for a change in distance between the nozzle and the printing surface, in order to cut the fibre reinforced material by the cutting tool. Thus, a length dimension of a cohesive fibre reinforced material to be printed can be trimmed in a particularly simple and precise manner, as cutting is performed directly on the workpiece to be printed. Thereby, it may be preferable that the nozzle, which is normally disposed directly at a position to be printed, is raised slightly, so that the cutting tool can enter this point and perform a trimming.

In another preferred embodiment of the invention, the printhead further comprises a feeding element, comprising a first conveying unit for the polymer and a second conveying unit for the fibre roving, and preferably a cooling element, between the infiltration unit and the feeding element. A feeding element preferably operates together with at least one feeder and actively conveys the feeder through a conveying unit. A conveying unit for the polymer, in the form of a filament and/or the fibre bundle, can preferably be realised by counter-rotating rollers, similar to the haul-off unit for the fibre reinforced material described above. A conveying unit for the polymer, in the form of a filament, and/or the fibre bundle can also be achieved using a Bowden-type system, similar to the Bowden extruder described above. Likewise, a screw extruder may be preferred for the polymer in the form of granulates. Preferably, there is a cooling element between the infiltration unit and the feeding element. This preferably prevents the polymer, in particular, from being heated too much and from acquiring properties unsuitable for feeding, as a result of melting. The cooling element can thereby preferably be designed similarly to the cooling element described above. The feeding of the matrix material can be done by means of a filament, which is fed to the printhead e.g. through a Bowden tube. Alternatively, the conveying unit can be directly connected to the mould and moved along with it. Conveying in the form of a filament is usually supported by all 3D printer firmware. In addition to conveying the filament, it is also possible to produce the polymer melt using a screw extruder or similar device, and to feed it directly into the printhead. The advantage of this is that the heating time is reduced, because the filament is already produced in an extruder where, for example, chain degradation can occur with sensitive polymers.

In another preferred embodiment of the invention, the cutting tool is located between the feeding element and the infiltration unit. Thus, a cutting, in particular of the fibre roving, can be carried out before the feeding. This embodiment is particularly useful, if the polymer is to be printed continuously, but the reinforcement is to be interrupted by the fibres at some points, e.g. in order to print particularly filigree and acute-angled structures.

In another preferred embodiment of the invention, a Bowden system is included, wherein the Bowden system comprises a Bowden tube between the infiltration unit and the hotend, and a cutting tool, which is disposed in front of the Bowden tube or behind the Bowden tube, in front of or behind the hotend. The Bowden system is preferably an embodiment of a haul-off unit. Thereby, the fibre reinforced material can be transported from the outlet, which is preferably cooled below the melting temperature of the polymer, through the interior of the tube. For example, at least one drive mechanism as already described, with two counter-rotating rollers or wheels, can be used. Preferably, there can be two such drives, one being disposed in front of and one behind the Bowden system. In such a system, due to the flexibility of the Bowden tube, the nozzle or the hotend can preferably be moved independently from the infiltration unit, resulting in a movable element, to control the printing process, which is particularly compact and light, and can be moved particularly quickly and efficiently for printing. In order to greatly reduce the moving material of the printhead, it is possible/preferred to use a so-called Bowden system. Preferably, the conveying unit/extruder is not moved and the material is fed into the hotend by means of a Bowden tube, and melted and deposited there. Since the infiltration mould has a certain weight, it is possible to mount a unit, consisting of infiltration mould and conveying unit, on the outside of the printer. In this manner, the produced, cooled composite material can preferably be fed into the hotend, by means of a Bowden tube, in order to be melted again, and laid in webs. The hotend, consisting of a nozzle and a heating area, can advantageously be very small and, thus, also very light. The cutting unit can be integrated into the moving hotend, in order to shorten the extraction distance after a cutting operation. However, it is also possible to install it directly after the conveying unit, i.e. before the Bowden system, in order to further reduce weight. This preferably has the effect of extending the extraction distance. By using a Bowden system, it would also be possible to build a very small, lightweight printhead, preferably with additional nozzles/hotends, to process different materials and, thereby, enable multi-material printing. Multi-material printing is advantageous in additive manufacturing, as a component can be built with different functions in one step.

In another preferred embodiment of the invention, multiple nozzles and/or infiltration units are included. This makes it possible to provide different fibre reinforced materials with different polymers and or fibre roving, which can be printed substantially and/or partially simultaneously or at short intervals. In this manner, workpieces with different material properties can be printed particularly easily and quickly in the relevant areas.

In another preferred embodiment of the invention, an infiltration unit comprises several feeders for the polymer and/or fibre roving, whereby different material and/or fibre roving sizes can be: fed. It is thus possible, for example, to feed multiple filaments and/or granulates into the printhead, if a larger quantity of matrix polymer is required and/or polymers are to be mixed. By means of the mixing element, it is also possible to feed two reacting polymers into the mould and to start an additional curing/cross-linking reaction. Furthermore, it is possible, in this manner, to enable graded materials, starting with component A, with gradual transition to component B. The advantages of using different matrix materials can be better fibre matrix bonding and infiltration, resulting in a higher strength of the component. For certain applications, it is also conceivable that a poor fibre-matrix bond could be of interest, e.g. to ensure a protective function through local deformation. It is also preferable to combine several individual fibre strands (fibre roving) in the mould or to infiltrate each separately. The infiltration is more difficult with thicker fibre bundles and can, therefore, be simplified, by using thinner fibre bundles. There are prescribed thicknesses of the fibre bundles, as well. For certain applications, it would be conceivable to adjust the number of strands e.g. 3k, 6k, 12k and, if 3 times 3k were used, 9k would be possible. This would allow different fibre roving to be printed both consecutively and simultaneously. It is also preferably possible to combine different fibres, e.g. carbon fibres, for high strength and stiffness, and, additionally, aramid fibres for high impact strength and high elongation at break. Through such a combination, the strength/stiffness would be higher with the carbon fibres, than with the pure aramid fibres, and the low elongation at break of approx. 1.7% of the C-fibres (carbon fibres) could be significantly improved by the rather ductile fracture behaviour of the aramid fibre, so that, advantageously, a ductile fracture occurs, rather than a brittle fracture. By means of using different numbers of strands or types of fibres, the infiltration and, as such, the mechanical properties can be improved and an adjustment of the desired material behaviour is allowed. It may be preferred that more than one feeding is carried out through the same physical opening. This is particularly easy to implement for multiple fibre roving. In particular, one feeder is dedicated to the introduction of one type (material, thickness, etc.) of fibre roving and/or polymer.

It may also be preferable to feed several strands (fibre roving) through one feeder, or 2 fibre roving through one feeder each.

In another preferred embodiment of the invention, an element for a pre-treatment of the fibre roving is included, wherein the pre-treatment is selected from the group comprising sizing, removing an epoxy sizing and/or plasma treatment. A so-called second sizing can be applied, which allows a better fibre-matrix bonding by chemical bonds. Removal of the epoxy sizing by means of temperature is also preferably possible. In particular, a plasma treatment of the fibres is advantageous, due to the fact that the effect of the plasma treatment is time-dependent and the time between treatment and processing can be preferably adjusted, depending on the materials. During the plasma treatment, the surface is activated and new binding partners are formed, and surface energies are increased, as well, in order to significantly improve the fibre-matrix bonding. Furthermore, an upstream fibre optimisation unit (element), e.g. also a corona treatment, a chemical etching and/or oxidation, an application of a special sizing and/or a temperature treatment for oxidation and/or burning off of the existing sizing, can modify the . . . fibre surface and thusly achieve a better fibre-matrix bonding, which results in the possibility of increasing strength.

Sizing (English) or "Schlichte" (German) both preferably describe a protective layer on the fibre. For example, the fibres are relatively brittle and sensitive and the sizing provides protection. Often times, the sizing consists of approx. 1-3% by weight and is similar to the later matrix material, e.g. an epoxy resin sizing is often used, as the market for epoxy resin systems is the largest. Furthermore, sizing can preferably change the surface chemistry of the fibres and this leads to a better bonding to the matrix material, as the fibres are preferably very non-polar. For matrix materials with polar content (e.g. polyamides), a polar fibre surface is helpful thanks to sizing. With non-polar polymers (e.g. PP, PE), it may be useful to remove the sizing, in order to create a non-polar surface on the fibre. With a second sizing, a chemical is previously applied on the fibre with or without the first sizing, which then preferentially influences surface properties.

In a further aspect, the invention refers to the use of a printhead according to the above description for an additive process.

The average person skilled in the art will recognise that technical features, definitions and advantages of the preferred embodiments of the device according to the invention also apply to the use according to the invention and embodiments thereof.

In a further aspect, the invention refers to the use of a printhead according to the above description for the production of pre-pregs and/or organic sheets. Pre-pregs are preferably so-called fibre-matrix semi-finished products, pre-impregnated with reactive resins for a polymer matrix, which are, in particular, impregnated with a thermoset material. These can be further used for the production of components under temperature and pressure. Organic sheets are preferably impregnated with thermoplastic polymers.

The average person skilled in the art will recognise that technical features, definitions and advantages of the preferred embodiments of the device according to the invention also apply to the use according to the invention and embodiments thereof.

In another aspect, the invention refers to a process for additively manufacturing a fibre reinforced material, comprising fibre reinforcement in a polymer matrix with a printhead according to the above description, comprising the following steps:
  feeding the polymer and the fibre roving to the infiltration unit via at least one feeder;
  heating the infiltration unit using the heating element;
  guiding the polymer melted by heating within the infiltration unit along a channel between the feeder and the outlet, preferably with the polymer flow direction from the feeder to the outlet;
  guiding the fibre roving along the channel via the deflecting element, wherein the fibre roving undergoes a change in velocity, is guided and/or expanded, area by area, transversely and/or obliquely to the polymer flow direction from the feeder to the outlet and/or in a straight line between the feeder and the outlet.

The average person skilled in the art will recognise that technical features, definitions and advantages of preferred embodiments of the device according to the invention also apply to the process according to the invention and embodiments thereof.

In a preferred embodiment of the invention, the process further comprises the following steps:
  Controlled relative movement between the nozzle and the printing surface, and printing a fibre reinforced material on the printing surface, in accordance with an object to be printed;
  Preferably cutting the fibre reinforced material with the cutting tool, during and/or after completion of a printing operation.

This process allows a particularly simple and flexible production by means of an FDM/FFF process, whereby a workpiece with particularly improved mechanical properties can be produced, due to a particularly good bond between the fibre and the polymer matrix.

In another preferred embodiment of the invention, the fibre roving comprises fibres selected from the group comprising carbon fibre, aramid fibre and/or glass fibre and/or basalt fibres and/or the polymer is selected from the group comprising polyamides (in particular PA6, PA66, PA12), polyetheretherketone, polyetherketoneketone, polyphenylene sulphide, polysulphone, polyetherimide, polytetrafluoroethene, polycarbonate, polyethylene terephthalate (unmodified and modified with glycol), polylactide, acrylonitrile-butadiene-styrene copolymer, acrylonitrile-styrene-acrylate copolymer, styrene-acrylonitrile copolymer, polybutylene terephthalate polystyrene, epoxy resin, unsaturated polyester resin, vinyl ester resin, phenol-formaldehyde resin, diallyl phthalate resin, methacrylate resin, polyurethane, melamine resin and/or urea resin, preferably additionally mixtures and compounds consisting of the individual substances with additives, to increase the fibre matrix bonding.

These matrix materials have proven to be particularly suitable for flexible additive manufacturing, with a variety of flexibly selectable fibre materials, and result in particularly good mechanical properties of the additively manufactured fibre reinforced material.

In a further preferred embodiment of the invention, the process refers to the manufacture of an orthosis and/or prosthesis. Orthoses and/or prostheses are highly individual and, as such, particularly suitable for flexible and fast additive manufacturing, in which the fibre reinforced material used can be freely selected, according to requirements (e.g. stability, elasticity and/or biological compatibility). At the same time, these are parts subject to extreme and permanent stress, whereby the particularly good bonding of the matrix to the fibre has proven to be especially suitable.

In another aspect, the invention refers to a fibre reinforced material comprising fibre reinforcement in a polymer matrix, produced by a printhead, according to the above description, and/or by a process, according to the above description.

The average person skilled in the art will recognise that technical features, definitions and advantages of preferred embodiments of the device and process according to the invention also apply to the material according to the invention and embodiments thereof.

Further Preferred Embodiments:

A device for producing a material comprising a fibre reinforcement in a polymer matrix for fibre composite production is preferred, which comprises:
  a mixing volume for a blend of a molten polymer and fibre roving;
  at least one feeder for a polymer and/or a fibre roving to the mixing volume;
  a heating element for at least partially melting the polymer within the mixing volume;
  at least one deflecting element within the mixing volume; and
  an outlet for the resulting material,
wherein the molten polymer can be guided within the mixing volume along a polymer flow direction, from the feeder to the outlet, and the fibre roving can be guided from the feeder to the outlet, by means of deflection around the deflecting element, area by area, transversely to the polymer flow direction.

In a preferred embodiment, the device comprises at least two, preferably at least three, more preferably at least four, and in particular five deflecting elements.

In a preferred embodiment, the deflecting element is cylindrical and has an axial arrangement vertically to the polymer flow direction within the mixing volume, wherein the arrangement and/or a radial extension of the deflecting element is configured for deflection of the fibre roving around the deflecting element, a change in velocity of the fibre roving, an expansion of the fibre roving and/or the guidance of the fibre roving, transversely to the polymer flow direction.

In a preferred embodiment, the polymer is fed in the form of granulate and/or filament.

In a preferred embodiment, a material conveying unit is further added behind the mixing volume, which is configured for a transport of the material.

In a preferred embodiment, a cutting tool is further comprised for cutting and/or trimming the material.

In a preferred embodiment, a printhead with a nozzle for additive manufacturing is further comprised, wherein the nozzle is located at the outlet of the mixing volume.

In a preferred embodiment, the cutting tool is located in front of a nozzle of the printhead, whereby here a second nozzle is preferably not connected to the mixing element, but to a second heating unit after the infiltration unit (see e.g. FIG. 2 below).

In a preferred embodiment, the cutting tool is located behind a nozzle of the printhead and the device is configured for a distance change between the printhead and a printing surface to cut the material using the cutting tool.

In a preferred embodiment, the cutting tool is located behind an outlet on the infiltration unit and in front of a second nozzle/heating unit, to extract the material from the infiltration unit, cut it off, if required, and place it through the second nozzle/heating unit in the form of the component.

In a preferred embodiment, a feeding element is further provided, comprising a first conveying unit for the polymer and a second conveying unit for the fibre roving, and preferably a cooler between the mixing volume and the feeding element, wherein the device is preferably configured for additive manufacturing of a fibre reinforced material.

In a preferred embodiment, the cutting tool is located between the feeding element and the mixing volume.

In a preferred embodiment, the device is used for an additive process.

In a preferred embodiment, the device is used to produce pre-pregs/organic sheets.

Furthermore, in one embodiment, a process is referred to for producing a material comprising fibre reinforcement in a polymer matrix for the production of fibre composite material, with a device according to one or more of claims 1-11, comprising the following steps:
  feeding the polymer and fibre roving to the mixing volume via the feeder;
  heating the mixing volume using the heating element;
  guiding the molten polymer within the mixing volume along the polymer flow direction, from the feeder to the outlet; and
  guiding the fibre roving from the feeder to the outlet via the deflecting element, wherein the fibre roving undergoes a change in speed, is guided transversely to the polymer flow direction area by area and/or is expanded.

In a preferred embodiment, this further comprises the following steps:
  Controlled relative movement between the printhead and the printing surface, and printing a fibre reinforced material on the printing surface, according to an object to be printed;
  Preferably cutting the fibre reinforced material with the cutting tool, during and/or after completion of a printing operation.

In a preferred embodiment of the process, the fibre roving comprises fibres selected from the group comprising carbon fibre, aramid fibre and/or glass fibre and/or basalt fibres and/or the polymer is selected from the group comprising polyamides (in particular PA6, PA66, PA12), polyetheretherketone, polyetherketoneketone, polyphenylene sulphide, polysulphone, polyetherimide, polytetrafluoroethene, polycarbonate, polyethylene terephthalate (unmodified and modified with glycol), polylactide, acrylonitrile-butadiene-styrene copolymer, acrylonitrile-styrene-acrylate copolymer, styrene-acrylonitrile copolymer, polybutylene terephthalate polystyrene, epoxy resin, unsaturated polyester resin, vinyl ester resin, phenol-formaldehyde resin, diallyl phthalate resin, methacrylate resin, polyurethane, melamine resin and/or urea resin, preferably additionally mixtures and compounds consisting of the individual substances with additives, to increase the fibre matrix bonding.

In a preferred embodiment, the process refers to the manufacture of an orthosis and/or prosthesis.

Furthermore, in one embodiment, a material refers to a fibre reinforced material, comprising fibre reinforcement in a polymer matrix, produced by a device as described above and/or by a process as described above.

A novel process for additive manufacturing of composites with continuous carbon fibres was also provided. A new printhead design, which infiltrates the carbon fibres in the printhead with a PA6 melt, for example, was researched and provided. Investigations showed bending strengths of preferably up to 550 MPa, a bending modulus of preferably about 40 GPa and a fibre volume content of preferably 30-35%. The additive manufacturing provides great advantages for the automated production of fibre reinforced materials. For example, the component is built up on a printing platform without a mould with supporting structures. A multi-material approach is possible with additional print heads, whereby the fibre reinforcement is mainly used where high strengths are required. The sustainability is surprisingly high, as there is no offcut when using carbon fibres, as is common, for example, when processing organic sheets.

DETAILED DESCRIPTION

The invention will be explained in more detail below, with the aid of examples and figures, without being limited to the thereto.

DETAILED DESCRIPTION OF THE FIGURES

Figure 1:
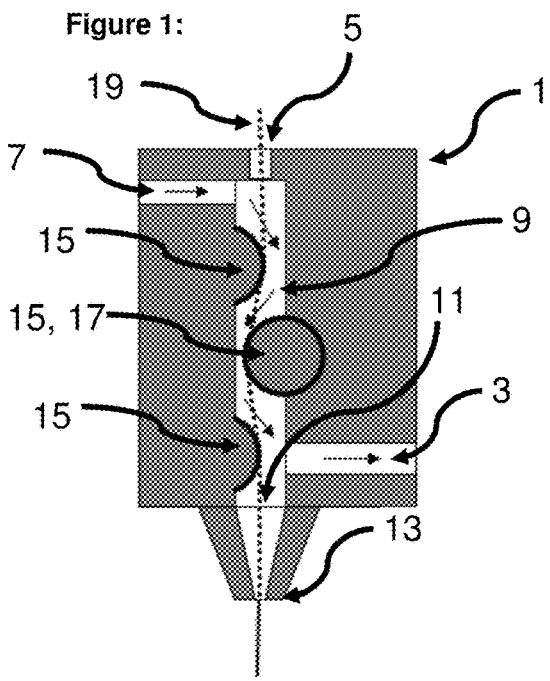
FIG. 1 shows a schematic representation of the printhead with infiltration unit and overflow.

FIG. 1 shows a schematic representation of the printhead with infiltration unit 1 and overflow 3. At the upper end of the infiltration unit, one can see the feeders for the fibre roving 5 and for the polymer 7 in the form of a filament, melt and/or granulate. These flow into a channel 9 down to the lower outlet 11, which passes directly into a nozzle 13 with a narrowing outlet cross-section for the fibre reinforced material to be printed. Three deflecting elements 15, which are designed differently, are visible in the channel 9. On the left side, two deflecting elements disposed one above the other are visible in the form of rounded edges, which are designed in the form of a cylinder segment projecting into the channel 9. On the right-hand side, there is a single deflecting element 15 in the form of a cylindrical pin 17, which is inserted in the side wall of the channel 9. One can see that the deflecting elements protrude beyond the centre of the channel in longitudinal direction 19 (dashed line) and thusly form a deflection, especially for the fibre roving (arrows in channel 9). At the lower end of the channel 9, before the outlet 11, an overflow 3 for residual polymer melt is shown pointing to the right.

Figure 2:
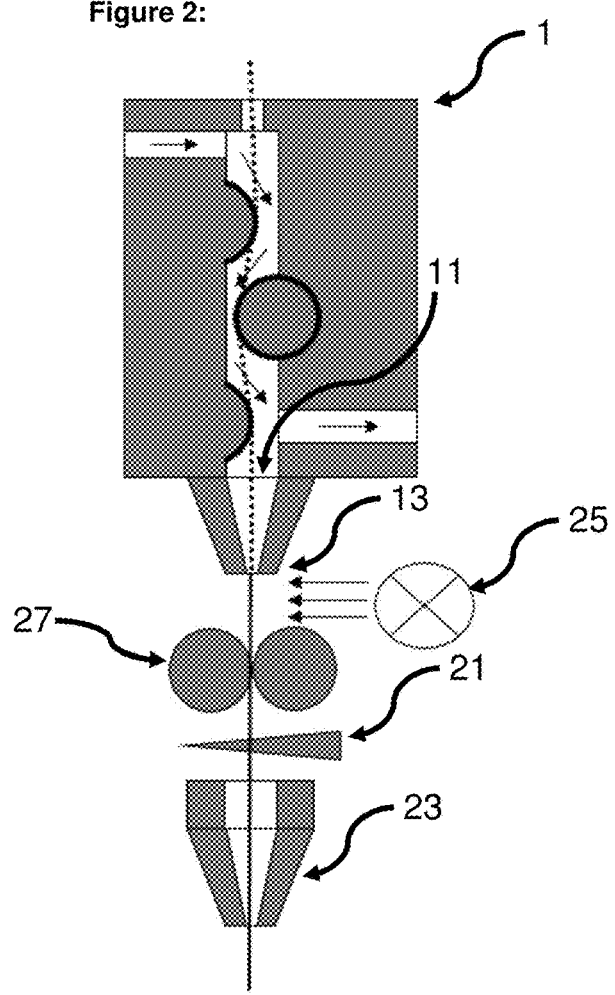
FIG. 2 shows a schematic representation of the printhead, together with an infiltration unit, containing a cutting unit and a second nozzle.

FIG. 2 shows a schematic representation of the printhead including an infiltration unit 1 with a cutting unit 21 and a second nozzle 23. The fibre reinforced material exiting the outlet 11 and the first nozzle 13 of the printhead is cooled (by a cooling element 25), in order to cool down and partially harden, so that the subsequent haul-off unit 27 in the form of two counter-rotating rollers can easily transport the material. Likewise, the material is now suitable for trimming by a cutting unit 21, which is disposed directly in front of a second nozzle 23, which is designed to lay the material on the printing surface. Preferably, this second nozzle 23 is a hotend, so that the material is melted again for printing.

Figure 3:
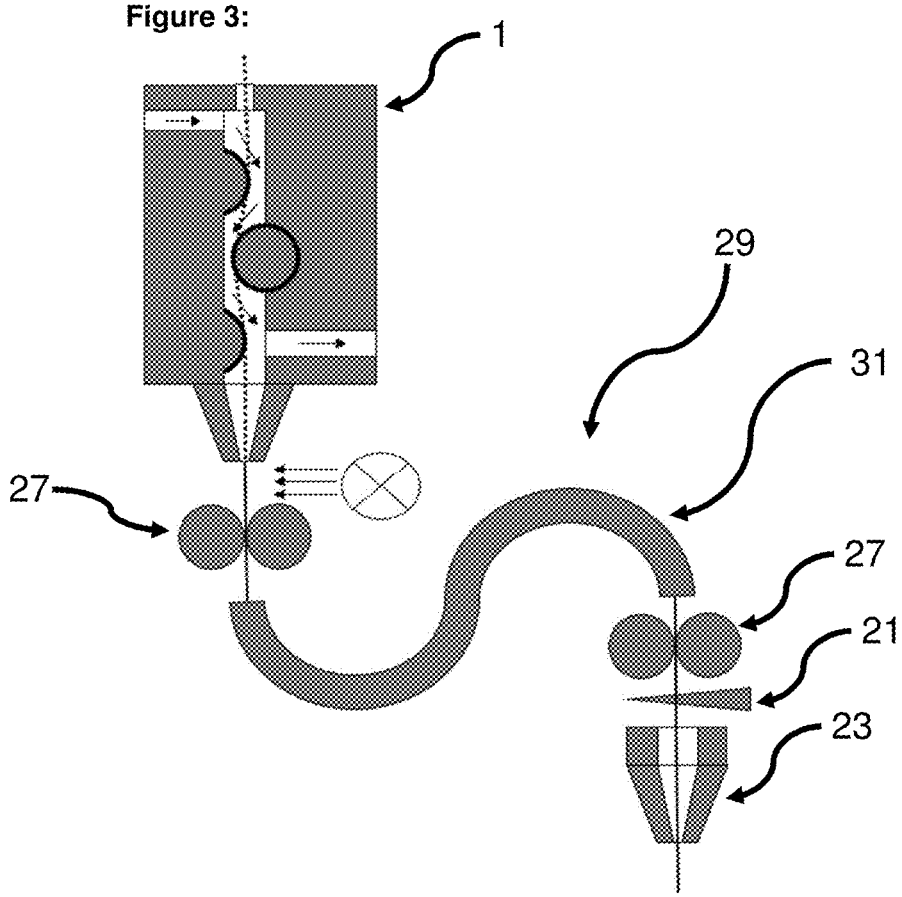
FIG. 3 shows a schematic representation of the printhead, including an infiltration unit with a Bowden system.

FIG. 3 shows, in addition to FIG. 2, a Bowden system 29 with a Bowden tube 31, which is disposed between two haul-off units 27, in order to transport the cooled fibre reinforced material through the tube 31. Thus, a very light and mobile printing unit can be provided in the form of a nozzle 23 (hotend) and a cutting tool 21, which can move independently of the infiltration unit 1.

Figure 4:
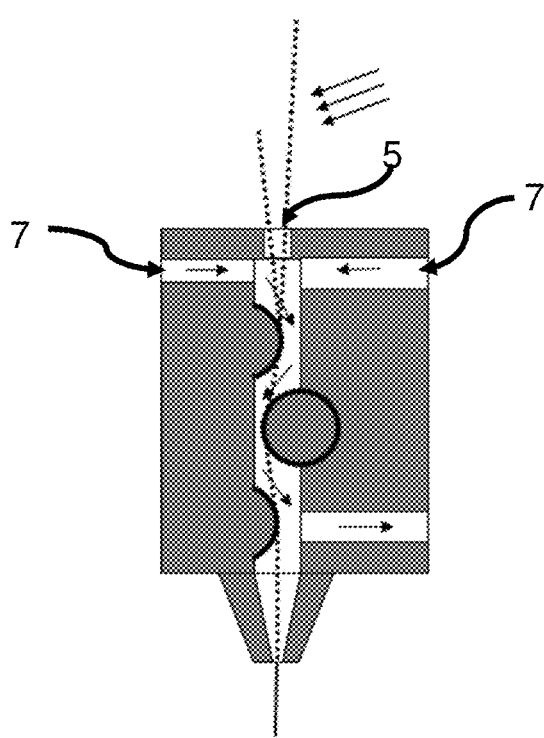
FIG. 4 shows a schematic representation of the printhead with several feeders each for polymer and fibre roving.

FIG. 4 shows a printhead with two feeders each for the polymer 7 and one 5 for the preferably several fibre rovings, whereby several openings for the fibre rovings are also preferably possible here. In this manner, different materials can be fed simultaneously and/or one after the other. The feeders for the fibre rovings are preferably conducted through the same physical opening.

Figure 5:
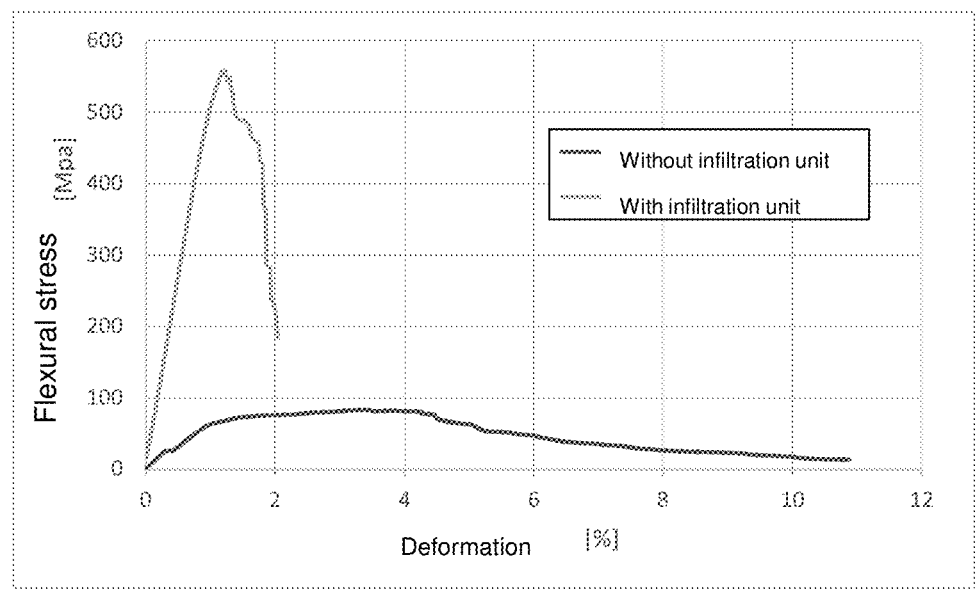
FIG. 5 shows a bending stress-strain diagram of a 3-point bending test with printed composite sample of a printhead without an infiltration unit.

FIG. 5 shows a bending stress-force-deformation diagram of a 3-point bending test, with printed composite sample of a printhead, without an infiltration unit. Mechanical tests were also carried out, for the time being, with a state-of-the-art printhead that does not allow deflection via pins. During the tensile loading of manufactured strands, it was recognised that the polymeric sheath ruptures under load and the fibres are pulled out. The determined strengths of the composite material are below the pure matrix material. In addition to the tensile tests, 3-point bending tests were also carried out. Based on a micrograph analysis, it was also determined that only a coating was possible and, as such, pressing the material in via the nozzle is not possible. The mechanical properties of the composite result from the missing transfer of forces between the fibres, which results in low bending strengths of <100 MPa and high plastic stretching >5%. The high plastic stretching can be seen in the bending load-deformation diagram; in the case of fibre reinforced materials this is typically around 1-3%, see FIG. 5.

Figure 6:
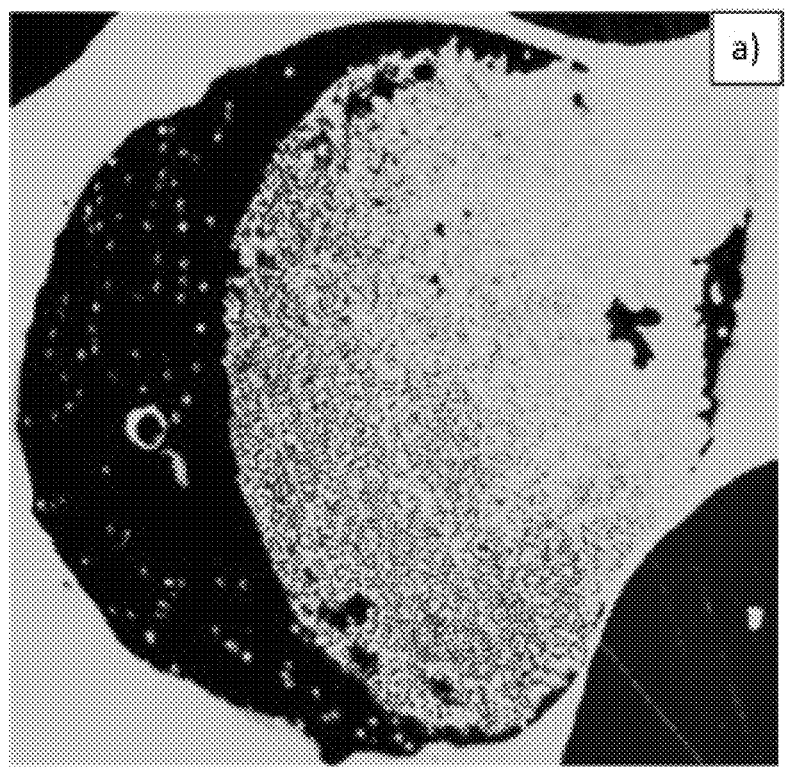
FIG. 6 shows a structure of a printhead. a) Coated roving. b) Infiltrated roving.
Figure 6:
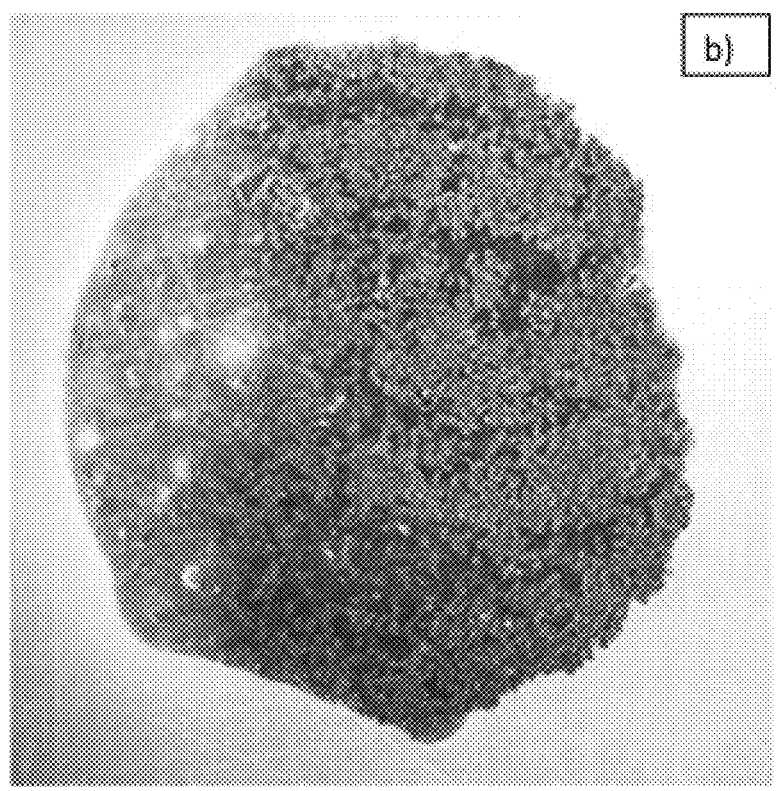
Figure 7:
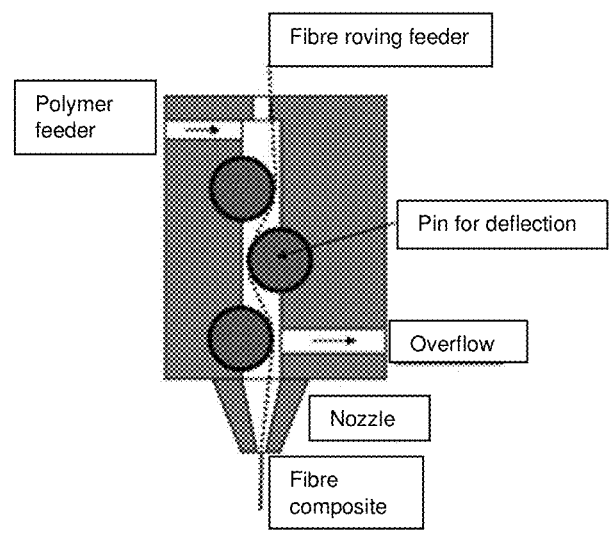
FIG. 7 shows a printhead with an infiltration unit.
Figure 8:
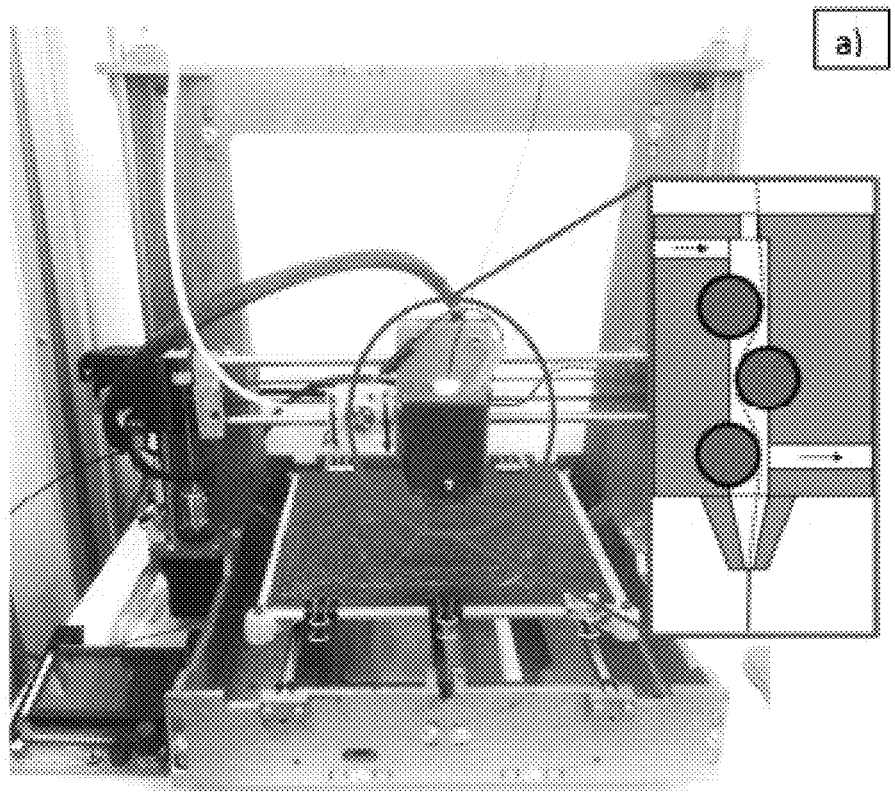
FIG. 8 shows a printer configuration and materials. a) Printing configuration: Graber I3/Toolson MK2 print parts (print area 200×200×100 mm³). b) Carbon fibres: Torayca T300 & Tenax HTA40; matrix polymer: PA6 filament (self-extruded).
Figure 8:
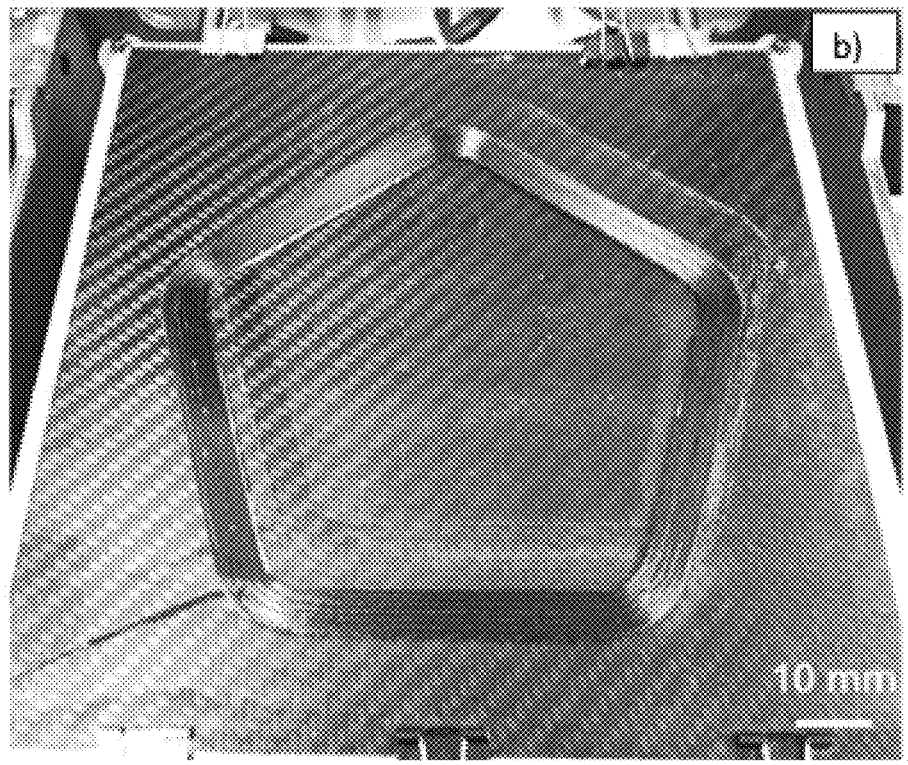
Figure 9:
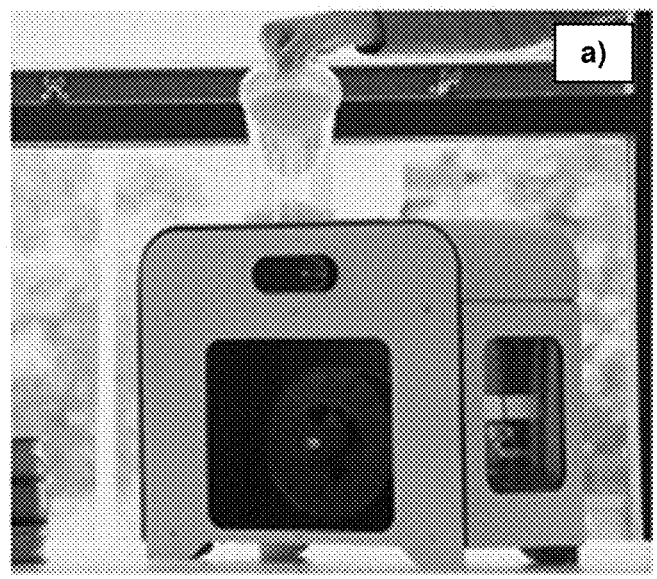
FIG. 9 shows an extrusion of a PA6 filament. a) Filament extruder Next Advance 3devo. b) Mechanical analysis.
Figure 9:
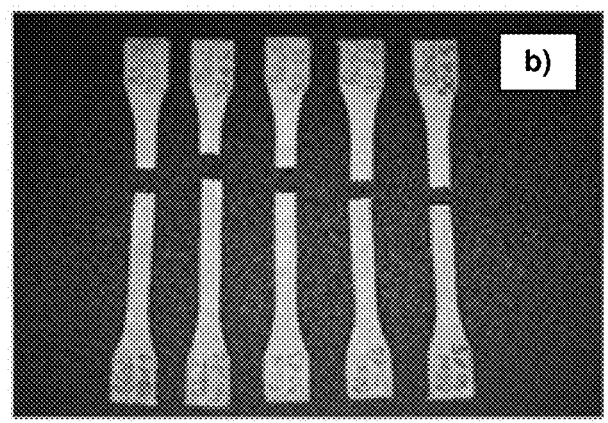
Figure 10:
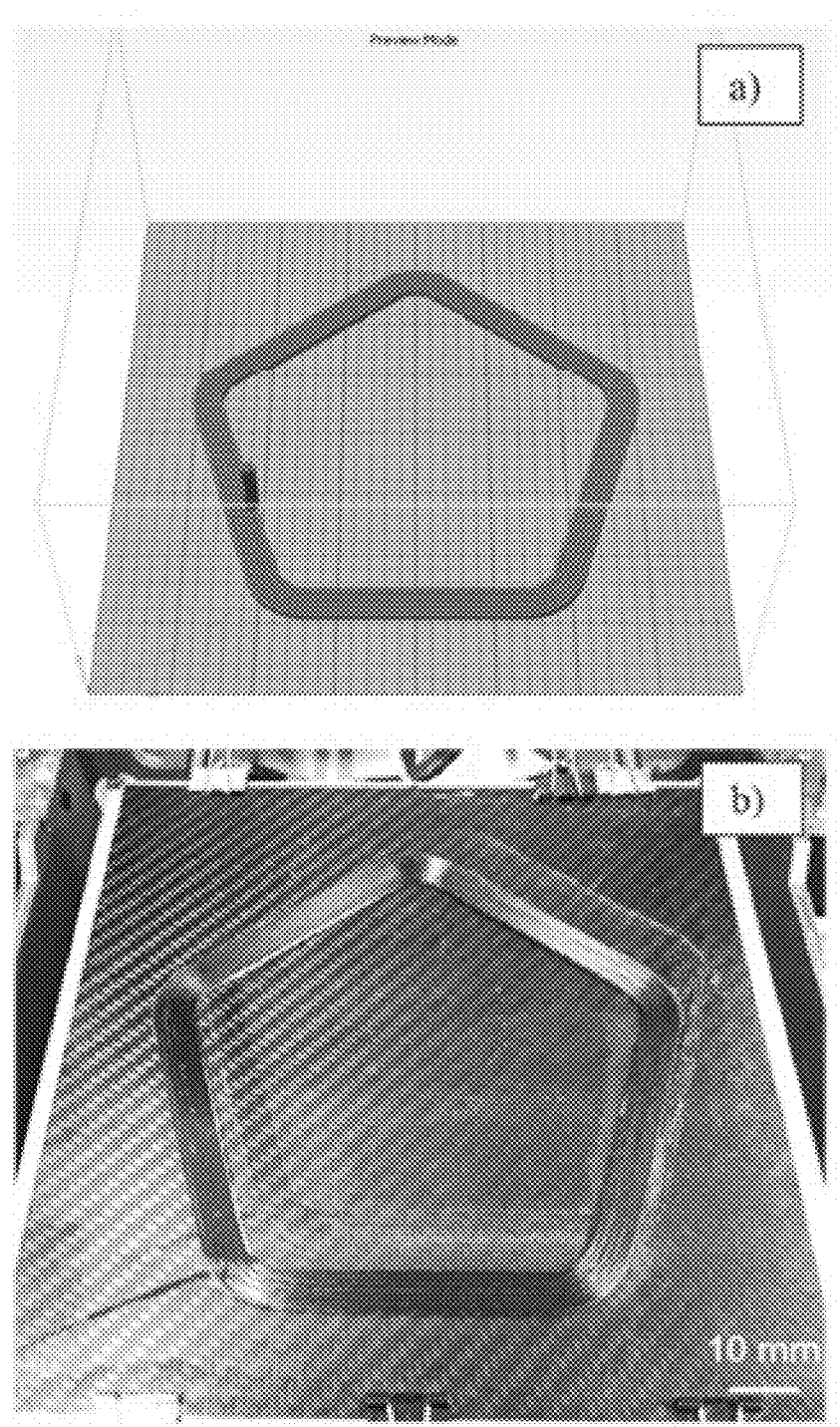
FIG. 10 shows a slicer configuration.
Figure 11:
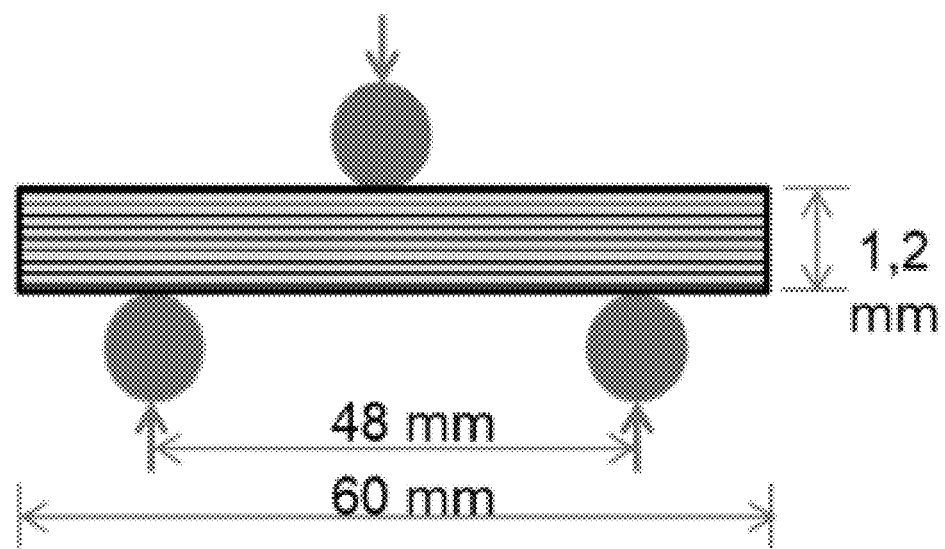
FIG. 11 shows a 3-point bending test according to DIN EN ISO 14125.
Figure 12:
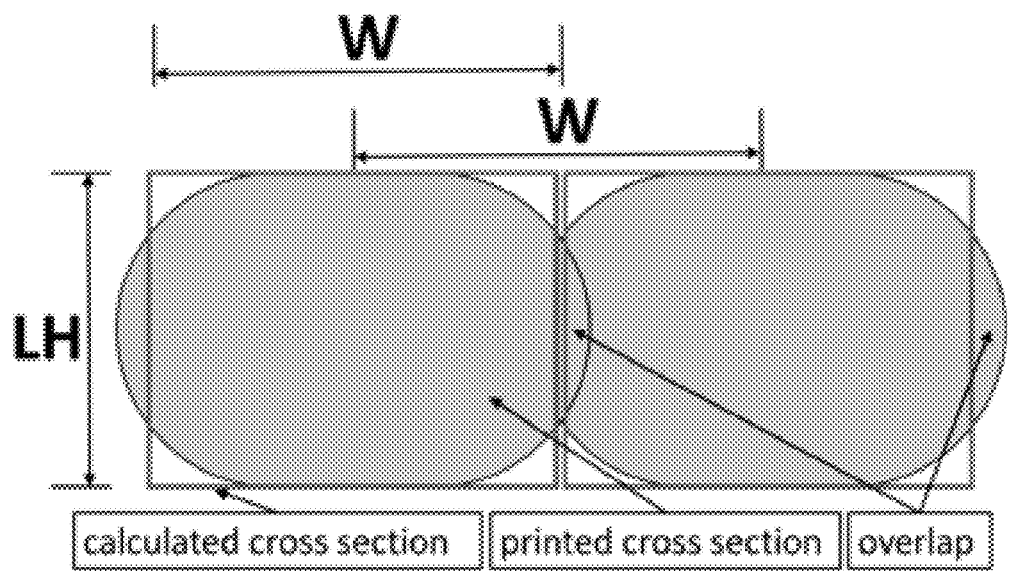
FIG. 12 shows an influence of a layer height to the optical resolution of the FDM print.
Figure 13:
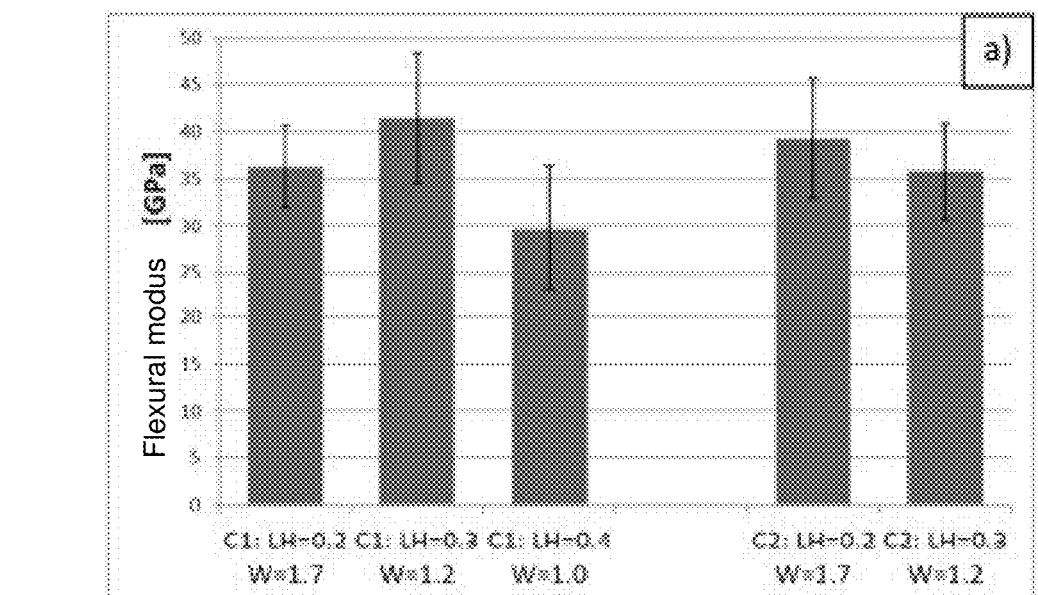
FIG. 13 shows a result of the 3-point bending test. a) Correlation between fibre volume content and flexural modulus. b) Higher bending strength with smaller layer height.
Figure 13:
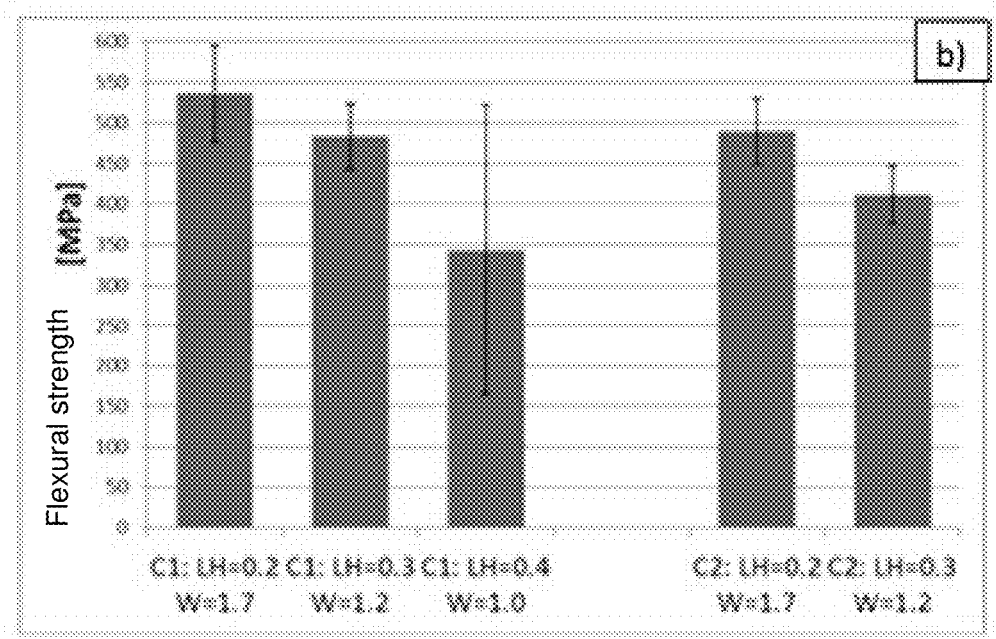
Figure 14:
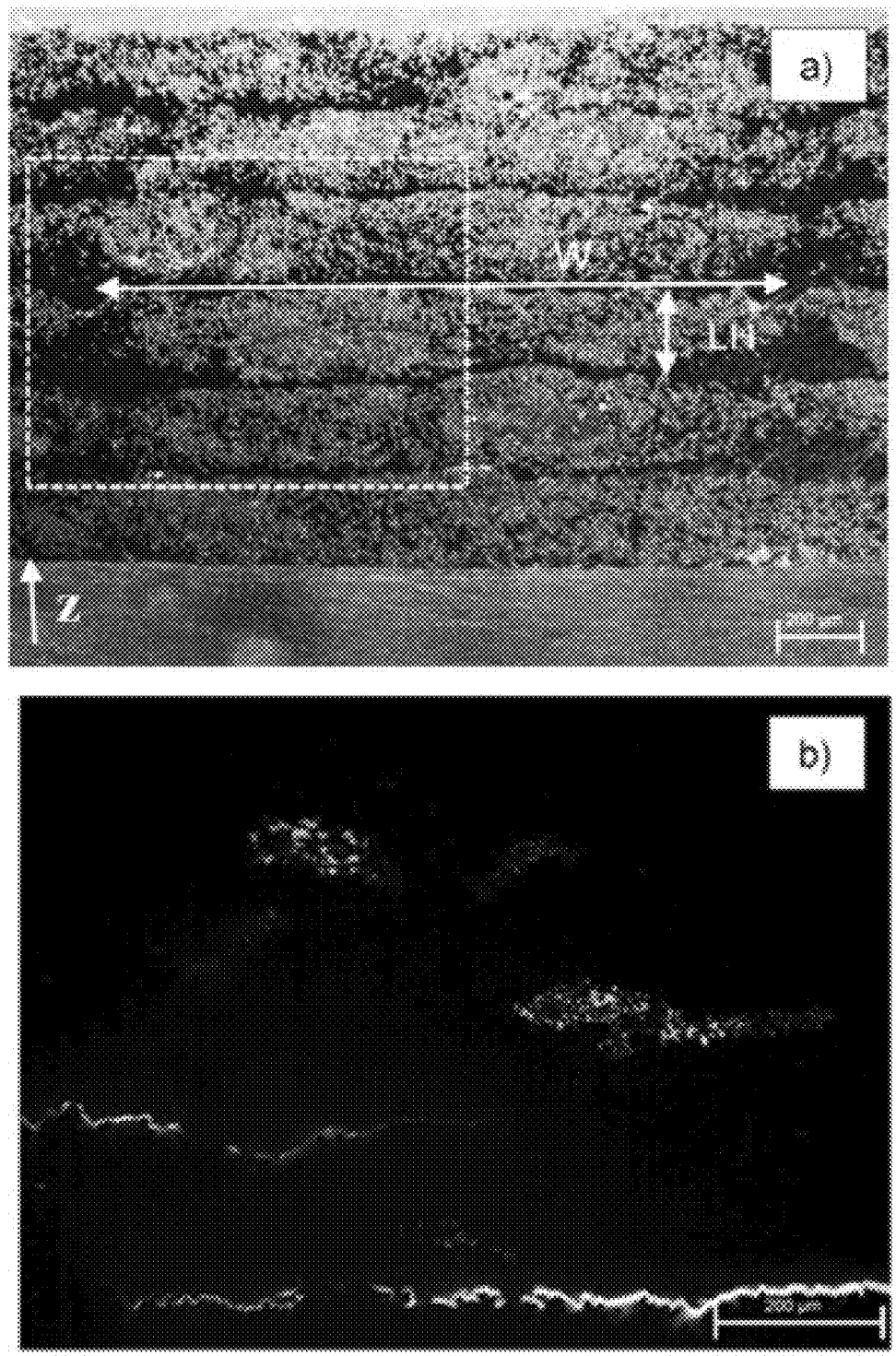
FIG. 14 shows pictures of a printed material. a) Dark field mode with normal light. b) Fluorescence mode with UV light.
Figure 15:
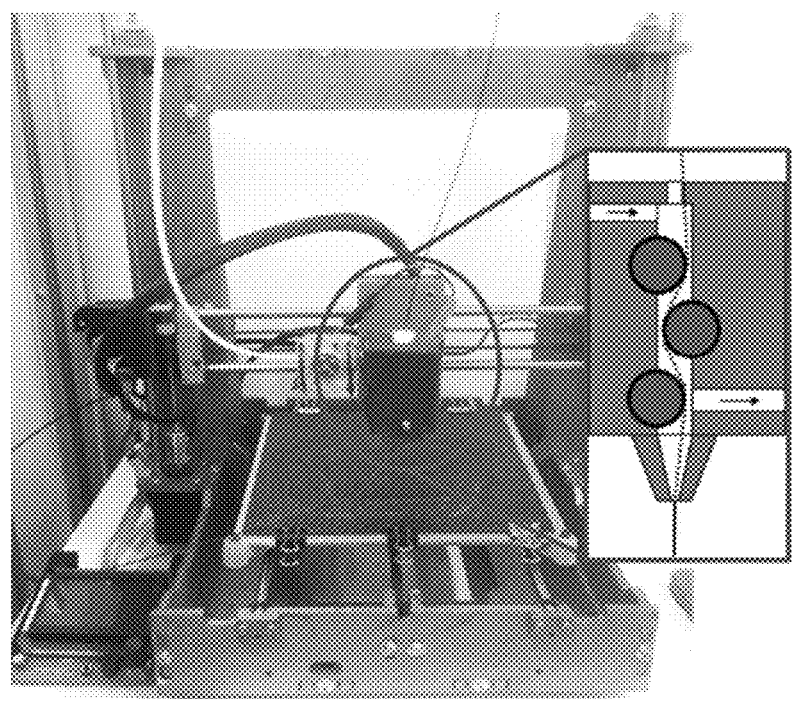
FIG. 15 shows a printer configuration.

FIG. 6:
Structure of the Printhead
State of the art: Publications with melt infiltration will only coat fibre rovings.
Research objective: Development of a printhead with infiltration effect.
Improved infiltration by:
  Widening of the fibre roving→Smaller infiltration distance
  Pressure field at the pins→Injection of the polymer melt
  6 a) Coated roving
  6 b) Infiltrated roving
FIG. 7:
Printhead with an infiltration unit
FIG. 8:
Printer configuration and materials
Open-source printing system for machine/firmware customisation
Printhead design open for other fibres (type, thread size) and matrix materials (thermoplastics)
8a) Printing configuration: Graber I3/Toolson MK2 print parts (print area 200×200×100 mm³)
8b) Carbon fibres: Torayca T300 & Tenax HTA40; matrix polymer: PA6 filament (self-extruded).
FIG. 9:
Extrusion of the PA6 filament
9a) Filament extruder Next Advance 3devo
Process steps:
  Drying of the PA6 granulate (70° C. for 16 h)
  Filament extrusion and winding
  Diameter check with 3 mm gauge
9b) Mechanical analysis:
  Tensile test, according to DIN EN ISO 527-2; specimen: 1BA.
  Tensile strength 0°=68 MPa
  Tensile strength 90°=57 MPa
  Tensile strength Z=45 MPa
FIG. 10:
10a)/10b) Slicer: Simplify 3d v4.01; slicer parameters: $t_{hotend}$=295° C., $t_{bed}$=60° C., cooling off, top-bottom layer 0, filling 1000%, printing speed 5 mm/s, speed of first layer 50%.
FIG. 11:
3-point bending test according to
DIN EN ISO 14125:

5 specimens
Fibre in loading direction
FIG. 12:
Influence of layer height LH and width W
Layer height LH influences the optical resolution of the FDM print and the build-up rate
In multi-material printing, the layer height of the composite and thermoplastic must be the same
Specimen geometry depends on the number of layers L and the number of webs per layer N
FIG. 13:
Result of the 3-point bending test.
Correlation between fibre volume content and flexural modulus
Higher bending strength with smaller layer height
FIG. 14:
Preparation: embedding agent with UV additive, micrograph near fracture surface.
Light microscope Leica DM4000 M: 14*a*) Dark field mode with normal light 14*b*) Fluorescence mode with UV light
FIG. 15:
see FIG. 8*a*)

At the Department of Ceramic Materials at the Technical University of Berlin, a novel process for the additive manufacturing of composites with continuous carbon fibres was investigated. A new printhead design, which infiltrates the carbon fibres in the printhead with a PA6 melt was researched. Investigations resulted in bending strengths of up to 550 MPa, a bending modulus of about 40 GPa and a fibre volume content of 30-35%. Additive manufacturing provides great advantages for the automated production of fibre reinforced materials. For example, the component is built up on a printing platform without moulds with supporting structures. A multi-material approach is possible with additional printheads, whereby the fibre reinforcement is mainly used where high strengths are required. Sustainability is very high, as there is no offcut when using carbon fibres, as it is common, for example, in the processing of organic sheets.

REFERENCE LIST

1 Infiltration unit
3 Overflow
5 Feeder for fibre roving
7 Feeder for the polymer
9 Channel
11 Outlet
13 Nozzle
15 Deflecting element
17 Cylindrical pin
19 Centre of the duct
21 Cutting unit
23 Second nozzle
25 Cooling element
27 Haul-off unit
29 Bowden system
31 Bowden tube

The invention claimed is:

1. A printhead for the additive manufacturing of a fibre reinforced material, comprising fibre reinforcement in a polymer matrix of a molten polymer, comprising:
an infiltration unit for mixing and/or infiltrating a fibre roving with the molten polymer, wherein the infiltration unit is a mixing volume, wherein in the infiltration unit the fibre roving and a polymer are brought together in such a manner that the fibre reinforced material comprising fibre reinforcement is formed in a polymer matrix for the subsequent additive manufacturing;
at least one feeder for the polymer or the fibre roving to the infiltration unit;
a heating element, for at least partial melting of the polymer within the infiltration unit; and
an outlet of the infiltration unit for the resulting fibre reinforced material from the infiltration unit, characterised in that the infiltration unit comprises a channel between the at least one feeder for the polymer or the fibre roving and the outlet, wherein the infiltration unit is configured to guide the molten polymer and the fibre roving within the infiltration unit along the channel between the at least one feeder for the polymer or the fibre roving and the outlet, and the infiltration unit comprises at least one deflecting element within the infiltration unit, wherein the deflecting element is configured to deflect the fibre roving within the channel transversely or obliquely to a straight-line movement between the at least one feeder for the polymer or the fibre roving and the outlet, wherein the infiltration unit comprises at least one material overflow for the polymer, wherein the at least one material overflow is configured to discharge the polymer in or opposite to a direction of fibre movement, wherein the at least one material overflow is integrated in the infiltration unit, wherein the deflecting element has a bending transverse to the polymer flow direction or to a straight-line movement between the at least one feeder for the polymer or the fibre roving and the outlet, which can be described by a radius, the radius being between 1 mm to 20 mm, and wherein the deflecting element comprises a rounded edge or a rounded pin positioned to cross a center of the channel.

2. The printhead according to claim 1, characterised in that the molten polymer can be guided within the infiltration unit with a polymer flow direction, from the at least one feeder for the polymer or the fibre roving to the outlet, along a channel between the at least one feeder for the polymer or the fibre roving and the outlet, and the fibre roving can be guided within the channel, by means of deflection, around the deflecting element, area by area, transversely to the polymer flow direction, from the at least one feeder for the polymer or the fibre roving to the outlet.

3. The printhead according to claim 1, characterised in that the printhead comprises a nozzle for the controlled placement of the fibre reinforced material on a printing surface, wherein the nozzle is located at the outlet and wherein the nozzle and the printing surface are configured for a relative movement between the nozzle and the printing surface.

4. The printhead according to claim 3, characterized in that the relative movement between the nozzle and the printing surface is in all spatial direction or with all possible degrees of freedom.

5. The printhead according to claim 1, characterized in that the printhead comprises at least two or at least three, or at least four, or at least five deflecting elements.

6. The process according to claim 1, characterized in that 2-8 deflecting elements are included.

7. The printhead according to claim 1, characterised in that the printhead comprises at least one feeder each for the polymer and the fibre roving.

8. The printhead according to claim 1, characterized in that a layout and/or a radial extension of the deflecting element is configured for the deflection of the fibre roving around the deflecting element, a change in speed of the fibre roving, an expansion of the fibre roving and/or the guiding of the fibre roving transversely and/or obliquely to the polymer flow direction and/or for the straight-line movement between the at least one feeder for the polymer or the fibre roving and the outlet.

9. The printhead according to claim 1, characterised in that the deflecting element is cylindrical, and has an axial layout perpendicular to the polymer flow direction or to a rectilinear guide between at least one feeder for the polymer or the fibre roving and outlet within the channel.

10. The printhead according to claim 9, characterized in that the deflecting element comprises at least one rounded edge and/or pin within the channel.

11. The printhead according to claim 1, characterised in that a melting of the polymer is carried out before the at least one feeder for the polymer or the fibre roving.

12. The printhead according to claim 1, characterized in that the heating element is configured at least for heating of the polymer or the fibre roving to a temperature above the melting temperature of the polymer.

13. The printhead according to claim 1, characterised in that the polymer is fed in the form of granulates and/or filaments.

14. The printhead according to claim 13, characterized in that the filament is fed directly or through a Bowden extruder.

15. A printhead according to claim 13, characterized in that the granulate is fed through a screw extruder.

16. The printhead according to claim 1, comprising a material conveying unit after the infiltration unit, wherein the material conveying unit comprises two counter rotating rollers or wheels, and wherein the conveying unit is configured for conveying the fibre reinforced material towards a nozzle.

17. The printhead according to claim 1, comprising a cutting tool for cutting the fibre reinforced material.

18. The printhead according to claim 17, characterized in that the cutting tool is disposed in front of the nozzle, between a nozzle and the infiltration unit.

19. The printhead according to claim 1, characterized in that a hotend comprising a nozzle and a heating element for heating the nozzle.

20. The printhead according to claim 18, characterized in that a cooling element is comprised between the infiltration unit and the cutting tool and/or a hotend.

21. The printhead according to claim 18, characterized in that the cutting tool is disposed behind the nozzle and the printhead is configured for a distance change between the nozzle and a printing surface for cutting the fibre reinforced material by the cutting tool.

22. The printhead according to claim 1, further comprising a feeding element, comprising a first conveying unit for the polymer and a second conveying unit for the fibre roving.

23. The printhead according to claim 20, characterized in that a Bowden system is included, whereby the Bowden system, comprises a Bowden tube between the infiltration unit and the hotend, and a cutting tool, which is disposed in front of the Bowden tube or behind the Bowden tube, in front of or behind the hotend.

24. The printhead according to claim 1, characterized in that several nozzles or infiltration units are included.

25. The printhead according to claim 24, further comprising a cooling element between the infiltration unit and the at least one feeder for the polymer or the fibre roving.

26. The printhead according to claim 1, characterized in that an infiltration unit comprises several feeders for the polymer and/or the fibre roving, whereby different materials and/or fibre roving strengths are fed.

27. The printhead according to claim 1, characterised in that an element for a pre-treatment of the fibre roving is comprised, wherein the pre-treatment is selected from the group comprising sizing, removing an epoxy sizing and/or plasma treatment.

28. A process comprising using the printhead of claim 1 to carry out an additive process comprising the steps of:
mixing and/or infiltrating a fibre roving with a molten polymer to an infiltration unit, wherein the infiltration unit is a mixing volume, wherein in the infiltration unit the fibre roving and the polymer are brought together in such a manner that a fibre reinforced material comprising fibre reinforcement is forced in a polymer matrix for the additive process,
heating by a heating element for at least partial melting of the polymer within the infiltration unit,
wherein the molten polymer and the fibre roving is guided along a channel of the printhead and a deflecting element deflects the fibre roving within the channel transversely or obliquely to a straight-line movement between a feeder and a outlet, wherein at least one material overflow for the polymer discharges the polymer in or opposite to a direction of fibre movement.

29. The process according to claim 28 wherein the additive process comprises the production of pre-pregs and/or organic sheets.

30. A process for additively manufacturing a fibre reinforced material, comprising a fibre reinforcement in a polymer matrix using the printhead according to claim 1, comprising the following steps:
feeding the polymer and the fibre roving to the infiltration unit via at least one feeder;
heating the infiltration unit by the heating element;
guiding the polymer melted by heating inside the infiltration unit along a channel between the feeder and the outlet, preferably with the polymer flow direction from the feeder to the outlet;
guiding the fibre roving along the channel via the deflecting element, the fibre roving
undergoing a change in speed, being guided and/or widened, area by area, transversely and/or obliquely to the polymer flow direction from the feeder to the outlet and/or being guided in a straight-line movement between the feeder and the outlet.

31. The process according to claim 30 for an additive process, further comprising the steps of:
controlled relative movement between the nozzle and the printing surface, and printing a fibre reinforced material on the printing surface, according to an object to be printed;
preferably cutting the fibre reinforced material with the cutting tool during and/or after completion of a printing operation.

32. The process according to claim 30, characterised in that the fibre roving comprises fibres selected from the group comprising carbon fibre, aramid fibre and/or glass fibre and/or fibres and/or the polymer is selected from the group comprising polyamides (in particular PA6, PA66, PA12), polyetheretherketone, polyetherketoneketone, polyphenylene sulphide, polysulphone, polyetherimide, polytetrafluoroethene, polycarbonate, Polyethylene terephthalate (unmodified and modified with glycol), polylactide, acrylonitrile-butadiene-styrene copolymer, acrylonitrile-styreneacrylate copolymer, styrene-acrylonitrile copolymer, polybutylene terephthalate polystyrene, epoxy resin, unsaturated polyester resin, vinyl ester resin, phenol-formaldehyde resin, diallyl phthalate resin, methacrylate resin, polyurethane, melamine resin and/or urea resin, preferably additionally mixtures and compounds, consisting of the individual substances with additives, to increase the fibre-matrix bonding.

33. The process according to claim 30, wherein the fibre-reinforced material forms an orthosis or prosthesis.

34. The printhead according to claim 1, characterized in that the radius is being between 2-5 mm.

35. The printhead according to claim 1, characterized in that the radius is being 4 mm.

* * * * *